US008670175B2

(12) United States Patent
Erlandson

(10) Patent No.: US 8,670,175 B2
(45) Date of Patent: Mar. 11, 2014

(54) METHOD AND SYSTEM FOR COMPACT AND EFFICIENT HIGH ENERGY PULSED LASER AMPLIFIER

(75) Inventor: Alvin Charles Erlandson, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 727 days.

(21) Appl. No.: 12/875,038

(22) Filed: Sep. 2, 2010

(65) Prior Publication Data

US 2011/0058249 A1     Mar. 10, 2011

Related U.S. Application Data

(60) Provisional application No. 61/240,002, filed on Sep. 4, 2009.

(51) Int. Cl.
*H01S 3/08*     (2006.01)

(52) U.S. Cl.
USPC ............................................. 359/333; 372/30

(58) Field of Classification Search
USPC ............................................. 359/333; 372/30
See application file for complete search history.

(56) References Cited

U.S. PATENT DOCUMENTS

| | | | | |
|---|---|---|---|---|
| 7,116,688 B2 * | 10/2006 | Sauter et al. | .................... | 372/25 |
| 7,463,658 B2 * | 12/2008 | Hollemann et al. | ............. | 372/21 |
| RE42,499 E * | 6/2011 | Weston et al. | ................ | 359/345 |

OTHER PUBLICATIONS

Bagnoud et al., Laboratory for Laser Energetics, "High-Energy, High-Average-Power Laser Using Nd:YLF Rods Corrected by Magnetorheological Finishing," LLE Review 99, Apr.-Jun. 2004, 9 pages total. Retrieved from the Internet: <http://www.lle.rochester.edu/pub/review/V99/99High04-C.pdf>.
Besnard, Chapter 5: The Megajoule Laser : A High-Energy-Density Physics Facility in *Lasers and Nuclei—Applications of Ultrahigh Intensity Lasers in Nuclear Science*, H. Schwoerer, J. Magill, B. Beleites (Eds.), Lect. Notes Phys. 694, Springer, Berlin Heidelberg 2006, pp. 67-77.
Bibeau et al., "Power, Energy, and Temporal Performance of the Nova Laser Facility with Recent Improvements to the Amplifier System," Appl Opt. Sep. 20, 1992;31(27):5799-5809.
Haynam et al., "National Ignition Facility Laser Performance Status," Applied Optics, Jun. 1, 2007; 46(16):3276-3303.
U.S. Appl. No. 12/875,056, filed Sep. 2, 2010; first named inventor: Alvin Charles Erlandson.

* cited by examiner

*Primary Examiner* — Mark Hellner
(74) *Attorney, Agent, or Firm* — Kilpatrick Townsend & Stockton

(57) ABSTRACT

An optical amplifier system includes an input aperture operable to receive light propagating along an optical path in a first direction and a first polarizer disposed along the optical path. The first polarizer is operable to pass light having a polarization state aligned with a first polarization axis. The system also includes a first Pockels cell operable to receive light passing through the first polarizer, an optical gain element disposed along the optical path, a second Pockels cell disposed along the optical path, and a second polarizer disposed along the optical path. The second polarizer is operable to pass light having a polarization state aligned with the first polarization axis. The system further includes a first mirror operable to receive light reflected from the second polarizer, a second mirror operable to receive light reflected from the first polarizer, and an output aperture operable to transmit light passing through the second polarizer.

34 Claims, 14 Drawing Sheets

METHOD AND SYSTEM FOR COMPACT AND EFFICIENT HIGH ENERGY PULSED LASER AMPLIFIER

CROSS-REFERENCES TO RELATED APPLICATIONS

This application claims priority to U.S. Provisional Patent Application No. 61/240,002, filed on Sep. 4, 2009, entitled "Compact, Efficient, High-Energy, Pulsed Lasers," the disclosure of which is hereby incorporated by reference in its entirety for all purposes.

The following two regular U.S. patent applications (including this one) are being filed concurrently, and the entire disclosure of the other application is incorporated by reference into this application for all purposes:

Application Ser. No. 12/875,038, filed Sep. 2, 2010, entitled "Method and System for Compact and Efficient High Energy Pulsed Laser Amplifier"; and Application Ser. No. 12/875,056, filed Sep. 2, 2010, entitled "Method and System for Compact, Multi-Pass Pulsed Laser Amplifier".

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

There is broad interest in the area of high-average-power lasers for materials processing, drilling, cutting and welding, military applications, and inertial confinement fusion. Many of the lasers that have been demonstrated at high average power have operated in a continuous wave (cw) mode, but there is also interest in rep-rated pulsed lasers that are also capable of producing high average power.

SUMMARY OF THE INVENTION

The present invention relates generally to optical systems. More specifically, the present invention relates to methods and systems for compact, efficient, high-energy, pulsed laser amplifiers. Merely by way of example, the invention has been applied to an amplifier system utilizing one or more optical switches to provide for a predetermined number of passes through an optical amplifier. The multiple passes can be made in a cavity or in a closed loop. The methods and systems can be applied to a variety of other laser systems and amplifier systems.

According to an embodiment of the present invention, an optical amplifier system is provided. The optical amplifier system includes an input aperture operable to receive light propagating along an optical path in a first direction and a first polarizer disposed along the optical path. The first polarizer is operable to pass light having a polarization state aligned with a first polarization axis. The optical amplifier system also includes a first Pockels cell operable to receive light passing through the first polarizer and an optical gain element disposed along the optical path. The optical amplifier system further includes a second Pockels cell disposed along the optical path and a second polarizer disposed along the optical path. The second polarizer is operable to pass light having a polarization state aligned with the first polarization axis. The optical amplifier system additionally includes a first mirror operable to receive light reflected from the second polarizer, a second mirror operable to receive light reflected from the first polarizer, and an output aperture operable to transmit light passing through the second polarizer.

According to another embodiment of the present invention, a method of amplifying input light having a first polarization state aligned with a first polarization axis is provided. The method includes directing the input light to impinge on a first polarizer having a transmission axis aligned with the first polarization axis, transmitting the input light through the first polarizer, transmitting the input light through a first Pockels cell operating in a first state, and amplifying the input light. The method also includes transmitting the input light through a second Pockels cell operating in a second state, reflecting the input light from a second polarizer having a transmission axis aligned with the first polarization axis, and reflecting the input light from a first mirror. The method further includes transmitting the input light through the second Pockels cell operating in the second state, amplifying the light to provide a twice amplified beam, transmitting the twice amplified beam through the first Pockels cell operating in the second state, and reflecting the twice amplified beam from the first polarizer. The method additionally includes reflecting the twice amplified beam from a second mirror and transmitting the twice amplified beam through the first Pockels cell operating in the second state.

According to yet another embodiment of the present invention, an optical amplifier system is provided. The optical amplifier system includes a first optical switch having a first state and a second state. The first optical switch is operable to pass light in the first state and reflect light in the second state. The optical amplifier system also includes an optical gain element coupled to the first optical switch and a second optical switch coupled to the optical gain element and having a first state and a second state. The second optical switch is operable to pass light in the first state and reflect light in the second state.

According to an alternative embodiment of the present invention, a method of amplifying optical radiation is provided. The method includes transmitting optical radiation through a first optical switch disposed in a first state, and amplifying the optical radiation. The method also includes reflecting the optical radiation from a second optical switch disposed in a second state and amplifying the optical radiation. The method further includes reflecting the optical radiation from the first optical switch disposed in a second state, amplifying the optical radiation, and transmitting optical radiation through the second optical switch disposed in a first state.

According to another alternative embodiment of the present invention, a laser amplifier is provided. The laser amplifier includes an input aperture operable to receive laser radiation having a first polarization state and a polarizer disposed along an optical path. The polarizer has a transmission axis aligned with the first polarization state. The laser amplifier also includes a Pockels cell disposed along the optical path and operable to receive light transmitted through the polarizer, an optical gain element disposed along the optical path, a polarization rotation device disposed along the optical path and operable to rotate the polarization of light from the first polarization state to a second polarization state orthogonal to the first polarization state, and a second polarizer disposed along the optical path. The second polarizer has a transmission axis aligned with the first polarization state. The laser amplifier further includes an optical loop operable to receive light reflected from the second polarizer and to direct light to impinge on the first polarizer and an output aperture disposed along the optical path.

According to yet another embodiment of the present invention, a method of operating an optical amplifier is provided. The method includes directing optical radiation having a first polarization state along an optical path, transmitting the optical radiation through a first polarizer having a polarization axis aligned with the first polarization state, and transmitting the optical radiation through a Pockels cell. No substantial change in the first polarization state of the optical radiation results from transmitting the optical radiation through the Pockels cell. The method also includes amplifying the optical radiation, rotating the polarization state of the optical radiation from the first polarization state to a second polarization state orthogonal to the first polarization state, reflecting the optical radiation from a second polarizer having a transmission axis aligned with the first polarization state, and rotating the polarization state of the optical radiation from the second polarization state to the first polarization state using the Pockels cell. The method further includes amplifying the optical radiation, rotating the polarization state of the optical radiation from the first polarization state to the second polarization state, reflecting the optical radiation from the second polarizer, and amplifying the optical radiation. The method additionally includes rotating the polarization state of the optical radiation from the second polarization state to the first polarization state, and transmitting the optical radiation through the second polarizer.

According to a specific embodiment of the present invention, a laser amplifier is provided. The laser amplifier includes an input aperture operable to receive laser radiation having a first polarization, an output aperture coupled to the input aperture by an optical path, and a polarizer disposed along an optical path. A transmission axis of the polarizer is aligned with the first polarization. The laser amplifier also includes an optical switch disposed along the optical path. The optical switch is operable to pass the laser radiation when operated in a first state and to reflect the laser radiation when operated in a second state. The laser amplifier further includes an optical gain element disposed along the optical path and a polarization rotation device disposed along the optical path.

According to another specific embodiment of the present invention, a method of amplifying optical radiation is provided. The method includes transmitting the optical radiation through a first polarizer, amplifying the optical radiation, injecting the optical radiation into a closed loop, and determining that the optical radiation is to be maintained in the closed loop. The method also includes activating an optical switch, amplifying the optical radiation, injecting the optical radiation into the closed loop, and determining that the optical radiation is not to be maintained in the closed loop. The method further includes deactivating the optical switch, amplifying the optical radiation, and transmitting the optical radiation through an output aperture.

Numerous benefits are achieved by way of the present invention over conventional techniques. For example, embodiments of the present invention provide pulsed lasers and amplifiers that can be built using less floor space and building volume than prior designs of comparable energy. Additionally, embodiments provide a system in which the amplified laser beam passes through the gain medium more times than in conventional designs, with an accompanying increase in amplifier gain. Moreover, front-end energy requirements are reduced and extraction efficiency in increased by embodiments of the present invention.

As described more fully throughout the present specification, some embodiments of the present invention utilize spatial filters that reduce or eliminate undesirable "pinhole closure" effects and allow beams to travel along precisely the same path on each pass. Embodiments of the present invention use either linear beam paths, in which the laser beam travels back and forth through the laser amplifiers, or closed-loop beam paths in which the beam passes through the laser amplifiers in the same direction during amplification passes. One or more Pockels cell-based optical switches are used to trap the injected laser beam during amplification and to switch the beam out of the amplifier after sufficient amplification has occurred. In some embodiments, near-field spatial filters, far-field spatial filters (also referred to as relay telescopes), or both, are utilized to limit the nonlinear growth of small-scale intensity features. As described below, relay telescopes that provide far-field spatial filtering can utilize cylindrical lenses and slit filters, which maintain the laser intensity at the slits below the threshold for "pinhole closure" effects or equivalent effects that occur in slit filters. In some embodiments, near-field spatial filters are used in conjunction with relay telescopes in order to achieve the superior spatial filter quality associated with relay telescopes while also preventing pinhole-closure or slit-closure effects from occurring.

Embodiments of the present invention are applicable to many laser and amplifier systems including high-energy pulsed lasers for laser-induced fusion energy (LIFE), laser-induced fusion for producing neutrons for weapons-effects testing, directed-energy weapons, laser peening and other types of laser materials processing, orbital debris clearing, generation of x-rays for plasma diagnostics, high-energy-density physics experiments, short-pulse lasers, and pump lasers for energizing amplifiers for short-pulse lasers. These and other embodiments of the invention along with many of its advantages and features are described in more detail in conjunction with the text below and attached figures.

DETAILED DESCRIPTION OF THE INVENTION

Figure 1A:
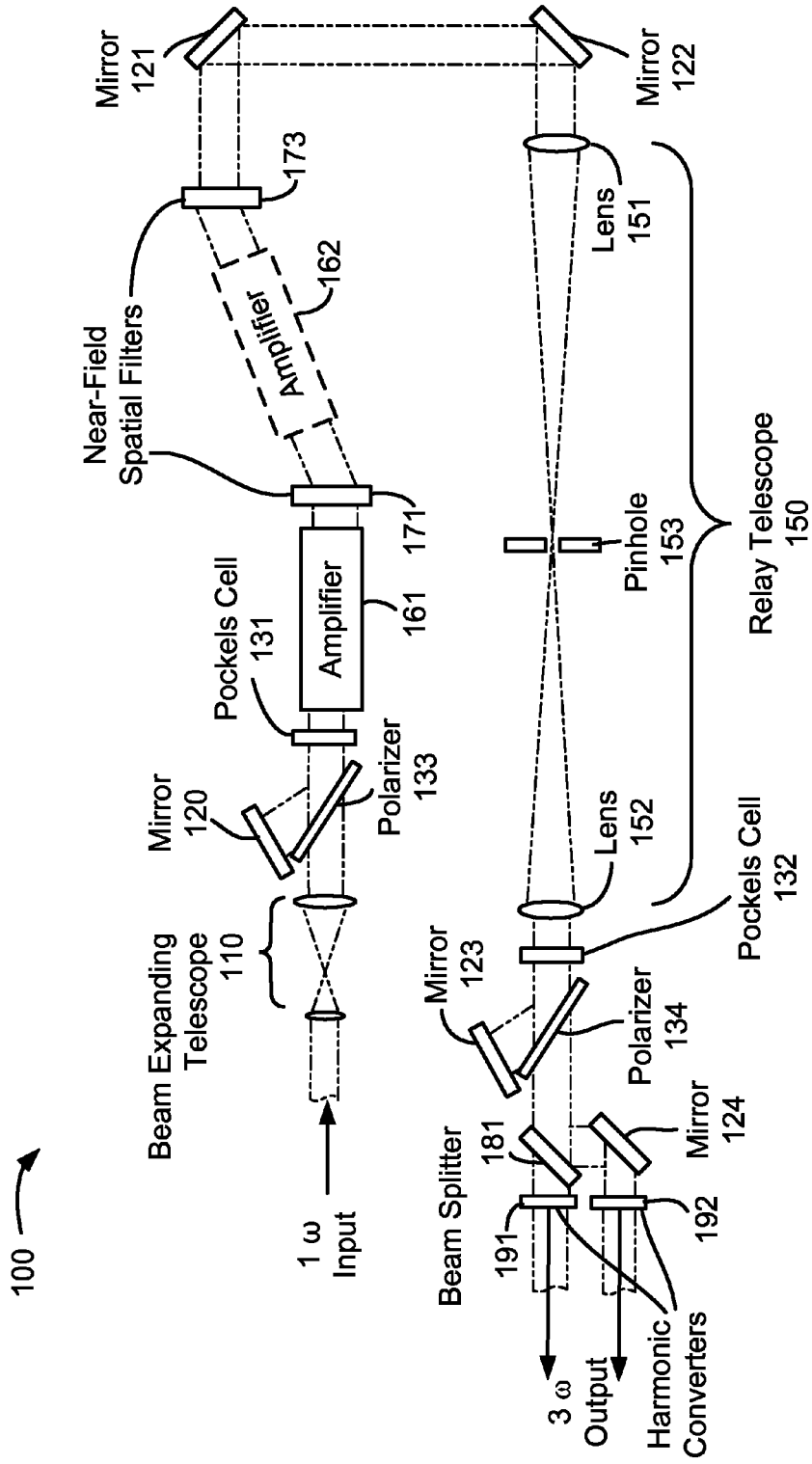
FIG. 1A is a simplified schematic diagram of a compact, multi-pass laser amplifier according to an embodiment of the present invention.

Previous high-energy, pulsed laser systems used for inducing inertial confinement fusion (ICF) implosions, such as the Nova and National Ignition Facility (NIF) lasers at Lawrence Livermore National Laboratory (LLNL), have occupied areas comparable in size to one or more football fields. Such large footprints are undesirable as they drive up hardware and building costs and limit siting options. Additionally, costs of such systems have been high, in part because sensitive optical components and their mounting hardware were cleaned, assembled, and installed using specialized equipment and labor at the laser site. This approach was necessary because the beamlines were too long for factory-assembled beamlines to be transported efficiently to the laser site. Prior designs have also required expensive "front end" pulse-generating systems, as greater front-end energy has been utilized to compensate for the limited gain of the main amplifier system. Gain was limited in part by the number of passes that the beam could make through the amplifiers. The efficiency with which energy was extracted from the amplifiers by the amplified beam was also limited by the number of passes made through the amplifiers.

In some laser amplifier designs, spatial-filter telescopes are major contributors to overall beamline length. Spatial-filter telescopes are used to smooth beam intensity distributions by using small, "pinhole" apertures to remove high-frequency components at the beam foci. Small-scale intensity features increase optical damage risk at the beam "hot spots" and degrade harmonic conversion efficiency and beam quality on target. Hot-spot intensities have been observed to increase with the so-called delta-B integral. As a rule of thumb, spatial filters are distributed throughout the beamline so as to keep the delta-B integral below ~2 radians. A second function of the spatial-filter telescopes is to reimage the beam at various planes along the beam path, thereby preventing undesirable diffraction effects. A third function of the spatial-filter telescopes is to allow low-energy beams from the pulse-generating "front ends" to be injected off of small mirrors near the focal plane of the telescopes (far-field injection). When such far-field injection is used, the injected beam propagates at a small angle with respect to the main optic axis so that the output beam that travels back through the telescope after amplification misses the injection mirror.

Thus, for some high-energy, pulsed laser systems, the length of spatial-filter telescopes has been driven by several requirements: length sufficient to relay images; length sufficient to avoid "pinhole closure" effects; and length sufficient to limit vignetting losses to acceptable values. Pinhole closure is a process in which the intensity at the edge of the pinhole aperture is great enough to produce a plasma that expands into the main part of the focused beam before the laser pulse has had sufficient time to clear the pinhole. Expanding plasma from the edge of the pinhole spatial filters can significantly distort and degrade the optical quality of the laser beam. Plasma expansion rates scale approximately with the intensity of the laser beam. Since beam intensity at the edge of the pinhole aperture falls as the inverse of the square of the length of the telescope (i.e., as the inverse of the square of the focal length of the telescope lenses), telescopes are preferably sufficiently long to prevent pinhole closure effects from occurring. Vignetting losses are related to the spatial filter pinholes. Since pinhole plasmas persist for times on the order of hundreds of nanoseconds between beam passes, the beam passes through a different spatial-filter pinhole on each pass. The separation between the pinholes is designed to prevent cross talk between pinholes and to ensure that the injection mirror is missed by the output beam when far-field injection is used. Since the pinhole locations correspond to different propagation directions, so that each pass through the amplifier is made in a slightly different propagation direction, the transverse dimensions of the beam are reduced to prevent the beam from being clipped at the hard aperture edges of the amplifier. Such reduction in beam area, called the "vignetting loss," is undesirable as it is accompanied by a reduction the damage-limited or delta-B-limited output energy. In some designs, vignetting losses are reduced by increasing the length of the spatial filters. Moreover, the number of passes made through the amplifiers is limited, in part, by vignetting losses. Since a different pinhole is used on each pass and since the pinholes are separated by minimum distances as discussed above, differences between the extreme angles at which the beam propagates through the amplifiers increase as the number of passes (and number of pinholes) is increased. Therefore, vignetting loss generally increases as the number of passes increases.

Embodiments of the present invention provide various architectures for compact, efficient, multi-pass amplifiers that are suitable for the production of high-energy, pulsed laser beams. As described more fully throughout the present specification, pinhole closure effects are reduced or eliminated by either 1) using near-field spatial filters so that there are no pinholes associated with relay telescopes at which pinhole closure effects would otherwise occur; 2) using combinations of near-field spatial filters and relay telescopes so that the intensity at the edges of the pinholes (or slits, for cylindrical-lens relay telescopes) stays below the threshold for pinhole closure effects to occur; or 3) using relay telescopes including cylindrical lenses (or astigmatic lenses) with slit filters located at line foci, rather than traditional spherical lenses with pinhole filters located at point foci. As described more fully throughout the present specification, the intensity at slit filters can be one or two orders of magnitude lower than intensities at pinhole filters, maintaining the intensities at levels below thresholds at which plasma production and closure effects occur.

According to the embodiments described herein, the laser beam that is amplified is passed through one or more amplifiers along a common round-trip path one or more times. The ability to pass the laser beam along the same path more than one time is facilitated by the elimination of the pinhole closure effects, as described above. Because the beam path can be the same on each round trip, vignetting losses are reduced or eliminated. Another characteristic of the embodiments described herein is that the vignetting loss can be equal to zero as the number of passes is increased. Thus, a greater number of passes can be made without increasing vignetting loss. In some embodiments, front-end energy requirements can be reduced and extraction efficiency can be increased relative to designs in which pinhole closure effects and vignetting losses impact performance.

FIG. 1A is a simplified schematic diagram of a compact, multi-pass laser amplifier according to an embodiment of the present invention. In the optical amplifier system 100 illustrated in FIG. 1A, a linear, many-pass beamline using two amplifiers, two near-field spatial filters, and one spherical lens relay telescope with an option for far-field spatial filtering is shown. Referring to FIG. 1A, an input pulse at the fundamental laser frequency (1ω) is injected into the beam expanding telescope 110. Although a beam at a fundamental laser frequency is illustrated in FIG. 1A, this is not required by the present invention and the frequency 1ω is intended to represent an initial frequency, which could be at a wavelength other than the fundamental frequency of a particular laser. In some embodiments, the beam expanding telescope 110 provides an input aperture operable to receive light propagating along an optical axis in a first direction. In embodiments in which beam expanding telescope 110 is optional, polarizer 133 can serve as an input aperture.

After expansion through the beam expanding telescope 110, the input beam, which is polarized in a first polarization state (e.g., a linearly-polarized state), is transmitted through polarizer 133, which has a transmission axis aligned with the first polarization state. Thus, polarizer 133 is aligned to pass light having a polarization state aligned with the first polarization axis, which, in the illustrated embodiment, is the p-polarization. As will be evident to one of skill in the art, the intensity of the beam propagated through the polarizer can be adjusted by rotating the axis of the polarization state of the input beam with respect to the transmission axis of the polarizer, or vice-versa. One of ordinary skill in the art would recognize many variations, modifications, and alternatives.

After passing through polarizer 133, the input light is incident on Pockels cell 131. Initially, Pockels cell 131 has zero voltage applied. Application of zero voltage to Pockels cell 131 can be referred to as having the Pockels cell operated in a first state or an off-state. When operated in this first state, light incident on the Pockels cell that is aligned with the first polarization axis (i.e., the p-polarization) will be transmitted through Pockels cell 131. Still in the p-polarization after transmission through Pockels cell 131, the beam is amplified by amplifier 161, also referred to as an optical gain element, and is then incident on near-field spatial filter 171.

Those skilled in the art will recognize embodiments of the present invention in which Pockels cells 131 is replaced with a half-wave plate, a 90-degree Faraday rotator is placed at a location within the beam path, and Pockels cell 132 is removed. For example, the Faraday rotator could be placed between amplifiers 161 and 162 to compensate for thermal birefringence which is likely to arise from operating amplifier gain elements at high average power, and to reduce beam depolarization arising from such thermal birefringence. With this arrangement of components, and with the half-wave plate axes oriented to effect a 90-degree rotation of the beam initial polarization, the beam passes through the amplifiers three times before exiting the laser cavity. Although this particular embodiment provides only three beam passes, it provides advantages of reduced complexity and cost because of elimination of the Pockels cells.

Many different types of amplifiers can be used as amplifier 161 and other optical gain media discussed herein. Possible gain media include gain media suitable for virtually any solid-state, liquid, or gas laser. In particular, high-energy solid-state laser gain media, such as Nd:glass, Nd:YAG, Nd:SrF$_2$, Yb:glass, Yb:YAG, Yb:S-FAP, Tm:YAG, Er:YAG, Ho:YAG, Ti:Sapphire, or the like are suitable for use in embodiments of the present invention. The amplifiers can be configured in one of several possible pumping configurations, such as normal-incidence slabs, Brewster-angle slabs, zig-zag slabs, rod amplifiers, or the like. Since the beam passes through the optical gain medium multiple times as described more fully below, amplifier media having relatively low single-pass gain, such as normal-incidence slabs or Brewster-angle slabs are particularly well suited for use in the architectures described herein. Thus, multiple optical gain media are useful and included within the scope of the present invention. Additionally, embodiments of the present invention can be implemented for any range of laser repetition rates or for any method of laser cooling. For example, normal-incidence slabs or Brewster-angle slabs could be repetitively pulsed and cooled using thin channels of turbulent gas.

In some embodiments, near-field spatial filter 171 is an optional element. The near-field spatial filter operates to spatially filter the input light after amplification, although near-field spatial filtering could be performed prior to amplification. If the input beam falls within the narrow acceptance angle of near-field spatial filter 171, the beam is efficiently diffracted at an angle with respect to the original direction of propagation of the incident beam, as shown in FIG. 1A. If the beam falls outside the acceptance angle, the beam propagates through near-field spatial filter 171, and is incident on a beam dump (not shown).

According to embodiments of the present invention, there are a number of suitable near-field spatial filters. Volume Bragg gratings are one type of near-field spatial filter that is suitable for use with embodiments of the present invention. As an example, volume Bragg gratings, also referred to as holographic optical elements, available from OptiGrate Corporation of Orlando, Fla., can be utilized. If the type of volume Bragg grating utilizes filters in only one direction, i.e., if the acceptance angle is defined only in one plane that is approximately parallel to the beam propagation direction, then spatial filtering in the orthogonal direction is achieved by using a second volume Bragg grating that is located close to the first, but with its acceptance angle defined in an orthogonal plane. One of ordinary skill in the art would recognize many variations, modifications, and alternatives.

In the embodiment illustrated in FIG. 1A, the beam, which has been amplified and filtered once, then propagates through optional amplifier 162 (i.e., a second optical gain element) and is incident on a second, optional near-field spatial filter 173, which has properties similar or identical to near-field spatial filter 171, for example, utilizing two orthogonal volume Bragg gratings. In some embodiments, additional optical gain elements are utilized as appropriate to the particular application. Moreover, although amplifier 161 and optional amplifier 162 are both illustrated as a single optical amplifier, this is not required by the present invention and a plurality of amplifier slabs can be utilized to provide the optical gain associated with either amplifier 161 or amplifier 162.

After reflection from mirrors 121 and 122, which are optional in some embodiments, the beam passes through an optional relay telescope 150, which includes a first spherical lens 151, a pinhole spatial filter 153, and a second spherical lens 152. Additional description related to relay telescopes is provided below. The beam then propagates to a second Pockels cell 132, which is operating in a second state (i.e., an "on" state) at high voltage. As the beam passes through Pockels cells 132, the polarization state of the beam is rotated, converting the polarization of the beam into a second polarization state that is aligned with a second polarization axis orthogonal to the first polarization axis. In the embodiment illustrated in FIG. 1A, transmission through Pockels cell 132 operating in the second state rotates the beam polarization to the s-polarization.

The beam is then incident on polarizer 134, which is oriented so that the transmission axis is aligned with the first polarization axis (i.e., aligned to pass the p-polarization and to reflect the s-polarization). Because of the polarization rotation experienced passing through Pockels cell 132, the beam is reflected from polarizer 134, is incident on mirror 123, and is reflected back upon itself. Thus, the polarization rotation imparted by Pockels cell 132 provides the ability for light to be reflected back along the optical path, providing for multi-pass operation of the optical amplifier system.

After reflection from mirror 123, the beam in the s-polarization state is reflected by polarizer 134, then transmitted through Pockels cell 132, which is still operating in the second state at high voltage. Accordingly, the polarization state of the beam is rotated back to the p-polarization state. On the reverse pass, the beam passes back through relay telescope 150, reflects from mirrors 122 and 121, and then passes through near-field spatial filter 173. As will be evident to one of skill in the art, if some of the optical elements are optional, then the description of the optical path will change accordingly. Near-field spatial filter 173 efficiently diffracts the beam back through amplifier 162, provided a return optical path is anti-parallel to the previous optical path along which the input beam was propagating. As light passes through the near-field spatial filter, rays that are not anti-parallel, pass through the near-field spatial filter and are incident on a beam dump (not shown). After passing through amplifier 162, the beam is incident on near-field spatial filter 171, which also efficiently diffracts the portion of the beam within the acceptance angle back through amplifier 161. Rays falling outside the acceptance angle are transmitted by the near-field spatial filter 171 and are incident on the beam dump (not shown).

After passing through amplifier 161, the beam is incident on Pockels cell 131, which is now operating in the second state (i.e., the "on" state at high voltage). Because Pockels cell 131 is operating in the second state, the polarization of the return beam is rotated from the p-polarization state to the s-polarization state. The beam is now in a polarization state orthogonal to the transmission axis of polarizer 133, which results in the return beam being reflected by polarizer 133 so that it is incident on mirror 120, which reflects the beam back upon itself Thus, referring to FIG. 1A, mirrors 120 and 123 form a multi-pass cavity through which the beam can make many round trips, being switched out on the last pass when Pockels cell 132 is operated in the first state (i.e., the voltage on Pockels cell 132 has been reduced to zero). In this instance of Pockels cell 132 being in the first state (i.e., the "off state"), no polarization rotation is associated with transmission through the Pockels cell and the beam in the p-polarization state passes through Pockels cell 132 remaining in the p-polarization state. The beam is then transmitted by polarizer 134, since the transmission axis of polarizer 134 is aligned with the p-polarization state, and is incident on beam splitter 181, which splits the beam into roughly equal transmitted and reflected components. The optical path after transmission through polarizer 134 can be referred to as an output aperture. Alternatively, the output aperture can include the optical paths after harmonic conversion as described below.

The transmitted component is incident on harmonic converter 191, which converts the beam to a desired harmonic frequency. The reflected component is reflected by mirror 124 and is incident on harmonic converter 192, which also converts the beam to a same or different desired harmonic frequency. In FIG. 1A, the harmonic conversion is illustrated as converting the input beam at $1\omega$ into an output beam at $3\omega$. Although the harmonic converters 191 and 192 are illustrated as a single element, one of skill in the art will appreciate that multiple optical elements can be utilized in the harmonic converters. Additionally, although harmonic converters external to the cavity are illustrated in FIG. 1A, intra-cavity converters are included within the scope of the present invention. In some embodiments, the beam splitters are not utilized and light passing through polarizer 134 passes through an optional harmonic converter so that the output aperture is the aperture of the polarizer or that of the harmonic converter.

Figure 1B:
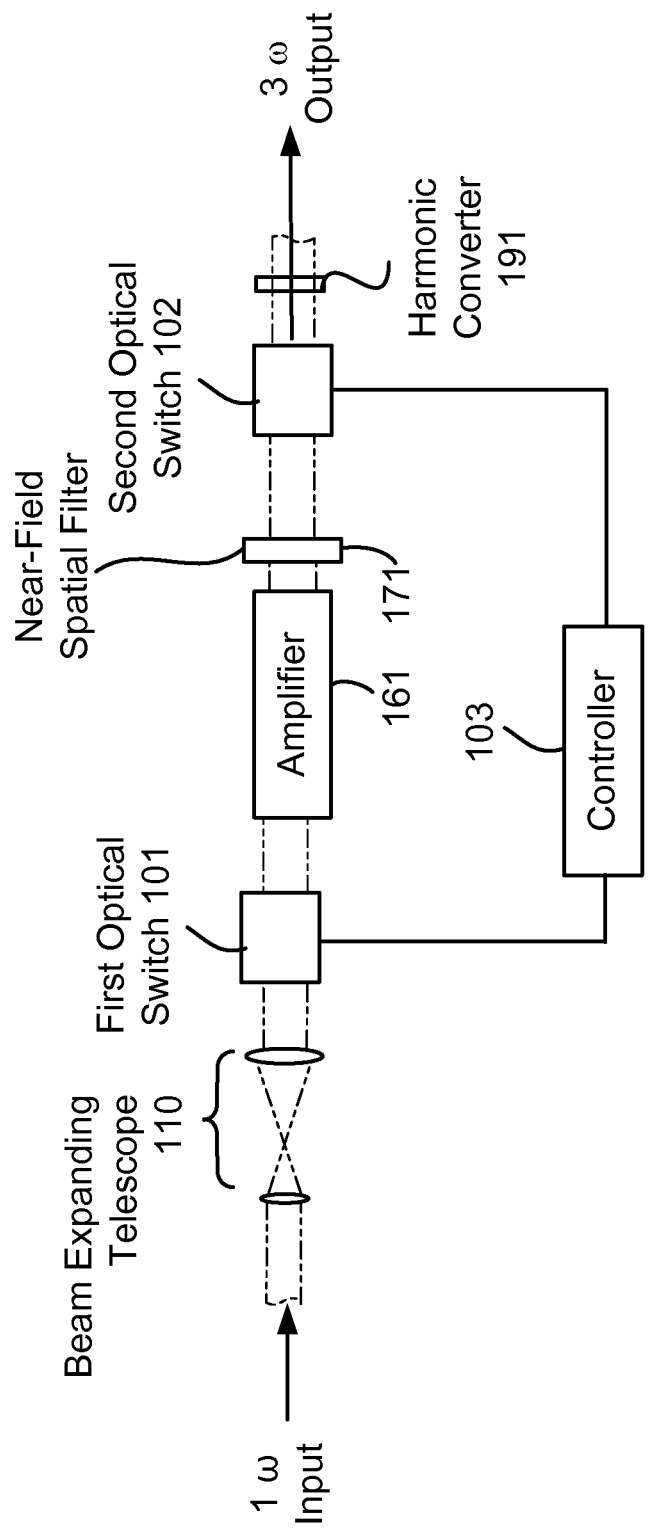
FIG. 1B is a simplified block diagram of an amplifier system according to an embodiment of the present invention.

FIG. 1B is a simplified block diagram of an amplifier system according to an embodiment of the present invention. A first optical switch 101 is disposed along an optical path connecting an input aperture and an output aperture. First optical switch 101 can be operated in two states, an "off" state and an "on" state. First optical switch 101, which includes Pockels cell 131, polarizer 133, and mirror 120 in the embodiment illustrated in FIG. 1A, is operable to pass light when operated in a first state and to reflect light when operated in a second state. When the Pockels cell is in the "off" state, light passes through the optical switch, but when the Pockels cell is in the "on" state, light is reflected off the polarizer and mirror to reflect the light from the switch. A second optical switch 102 includes Pockels cell 132, polarizer 134, and mirror 123 in the embodiment illustrated in FIG. 1A.

After an amplification pass through amplifier 161, light incident on the second optical switch 102 is reflected when the second optical switch is operated in the second state (i.e., the "on" state) and passes through the switch when the switch is operated in the first state (i.e., the "off" state). Controller 103 is provided to actuate the first optical switch 101 and the second optical switch 102. In an exemplary embodiment, in order to change the state of the first optical switch, the controller actuates Pockels cell 131 by placing it at high voltage to accomplish the polarization rotation that leads to reflection by polarizer 133. In a similar manner, controller 103 can change the state of the second optical switch 102 by actuating Pockels cell 132 by placing it at high voltage to accomplish the polarization rotation that leads to reflection by polarizer 134.

Thus, the amplifier system can be considered as two optical switches with one or more optical gain elements disposed along the optical path connecting the two optical switches. The number of amplification passes is determined by the state of the optical switches, with the amplified light being switched out of the amplifier system by changing the state of one of the optical switches. Optional elements as illustrated in FIG. 1A, including the near-field spatial filters, the relay telescopes for far-field spatial filtering, the beam splitters, the harmonic converters, and the like, can be added to this basic architecture. Embodiments of the present invention provide an architecture in which light can be injected at one end of the amplifier system and extracted at the other end of the amplifier system while making multiple passes through the optical gain media disposed along the optical path of the amplifier system.

As illustrated in FIG. 1A, one or more spatial filters can be used to maintain and/or improve the beam quality of the output produced using the multi-pass optical amplifier system 100. To reduce diffraction effects, relay telescope 150 reimages the beam at cavity end mirror 120 to cavity end mirror 123, and vice versa. In addition to optional relay telescope 150, pinhole closure effects associated with some relay telescopes can be reduced or avoided by using near-field spatial filters 171 and/or 173. Some embodiments utilize one or more near-field spatial filters as well as one or more far-field spatial filters in the form of a relay telescope. Using a far-field spatial filter (e.g., relay telescope 150) in conjunction with a near-field spatial filter has the advantage of removing any residual, high-angle rays that might be passed by the near-field spatial filter. For some near-field spatial filters, such as volume Bragg gratings, leakage at high angles can be present and this condition can be ameliorated by the use of the relay telescope. As described more fully below, it is preferable that pinhole aperture 153 is free of pinhole closure effects and the near-field spatial filter(s) can be utilized to help reduce the laser intensity at the edge of pinhole aperture 153 to an intensity below the threshold for plasma generation. Thus, combining both near-field and far-field spatial filters to attain far-field filtering quality without pinhole closure effects is provided by embodiments of the present invention, providing significant benefits in comparison with convention techniques.

Referring to FIG. 1A, the optical radiation in the beam travels back and forth through the amplifiers, along the same path, for an arbitrary number of passes, which is selected by the operator. For pulses of sufficient duration, the operator can choose the number of passes that are needed to produce the desired energy, or that are needed to extract the bulk of the energy stored in the amplifiers, whichever comes first. For shorter pulse durations, the multi-pass amplification is performed in a manner such that the output fluences do not exceed the optical damage limits of the various optical elements. A significant advantage provided by the multi-pass architecture described herein is that greater amplification of the injected beam can be achieved, enabling the energy provided by the input source to be decreased. In some embodiments, the amplification gain is high enough to enable the use of a reduced power small rod amplifier system, a fiber laser, or the like to be utilized as the front-end, pulse-generation system.

In some implementations, the coherent addition of optical aberrations due to passage of the beam many times through the same optics, which can be assumed to be imperfect, can place limits on the number of passes that the beam can make through the system. In order to counteract the effects of coherent addition of optical aberrations, adaptive optics can be utilized along the optical path. For example, one or both of the cavity end mirrors 120 and 123 could be a deformable mirror, with the shape of the mirror adjusted by a closed-loop, adaptive optics (AO) system to compensate for optical aberrations. In such a system, the beam can be sampled for wavefront measurements by the AO system via leakage through any of the mirrors in the system, or by a sampling beam splitter, sampling grating installed at any point along the beam path, or the like. Thus, through the user of an AO system, the number of passes that the input beam can make through the optical amplifier system can be increased, enabling the use of front-end sources with further reduced power outputs.

Embodiments of the present invention provide an architecture in which multiple configurations can be utilized within the scope of the present invention. For example, the locations of cavity end mirror 120 and beam expanding telescope 110 can be switched, such that the injected beam is launched into the amplifier with the s-polarization state so that it initially reflects from polarizer 133. In this alternative embodiment, the beam is trapped in the cavity in the p-polarization state and is transmitted through polarizer 133 on each pass. Similarly, the locations of the cavity end mirror 123 and the beam splitter 181 could be switched, such that the beam trapped in the cavity is in the p-polarization while the beam is switched out by reflection from polarizer 134. In this alternative embodiment, switching of the beam out of the multi-pass cavity is accomplished on the last pass by a change in the state of Pockels cell 132 so that the beam incident on polarizer 134 is in the s-polarization state. Additional embodiments are possible in which the beam that is passed through the amplifiers is either in the s-polarization state or the p-polarization state with respect to polarizers 133 and 134. As an example, some embodiments utilize a polarization rotation device positioned between the first optical switch 101 and the second optical switch 102 as illustrated in FIG. 1B. For these embodiments, the state of the switches is varied as needed to account for the polarization rotation experienced as the light propagates along the optical path. Merely by way of example, reflection from the polarizer may occur when the Pockels cell is in the "off" state, effectively changing the optical switch's operation so that light is transmitted through the switch when operated in the second state. One of ordinary skill in the art would recognize many variations, modifications, and alternatives.

As described above, one or more of the optical elements illustrated in FIG. 1A are optional and inclusion in FIG. 1A is not intended to imply that the illustrated optical elements are required. For example, amplifier 162 and near-field spatial filter 173 are optional and removal of these elements will be appropriate for implementations using a single stage of amplification per pass. On the other hand, additional stages of amplifiers and/or near-field spatial filters can be added to the architecture illustrated in FIG. 1A as appropriate to the desired output energy and pulse length. For example, for applications with relatively short pulse lengths, for which growth of small-scale features due to the nonlinear phase shift (delta-B) is an issue, it may be desirable to split the amplifier into several relatively short sections that are separated by near-field spatial filters. In this design, small-scale features will be filtered out (resetting the delta-B integral to zero) before hot spots result in optical damage. The use of near-field spatial filters in some embodiments to replace or supplement relay telescopes provides the advantage of allowing more stages of spatial filtering to be added, and greater nonlinear-phase-shift-limited energies to be attained, in systems for which the space allowed for the beamline is limited. One of ordinary skill in the art would recognize many variations, modifications, and alternatives.

An additional embodiment of the present invention provides two orthogonal beam polarizations that are transmitted equally well through the amplifiers, e.g., an amplifier using normal-incidence gain slabs. In this additional embodiment, a half-wave plate, active-quartz rotator, Faraday rotator, or the like can be installed between the amplifiers 161 and 162, so that a 90-degree polarization rotation occurs between the amplifiers. Such a polarization rotation provides for compensation of thermally-induced depolarization, which can be significant when lasers are operated in a repetitively-pulsed mode at high average power. A second, similar rotator might be disposed elsewhere along the optical path to provide a second rotation in order to counteract the rotation provided by the first rotator.

Figure 2:
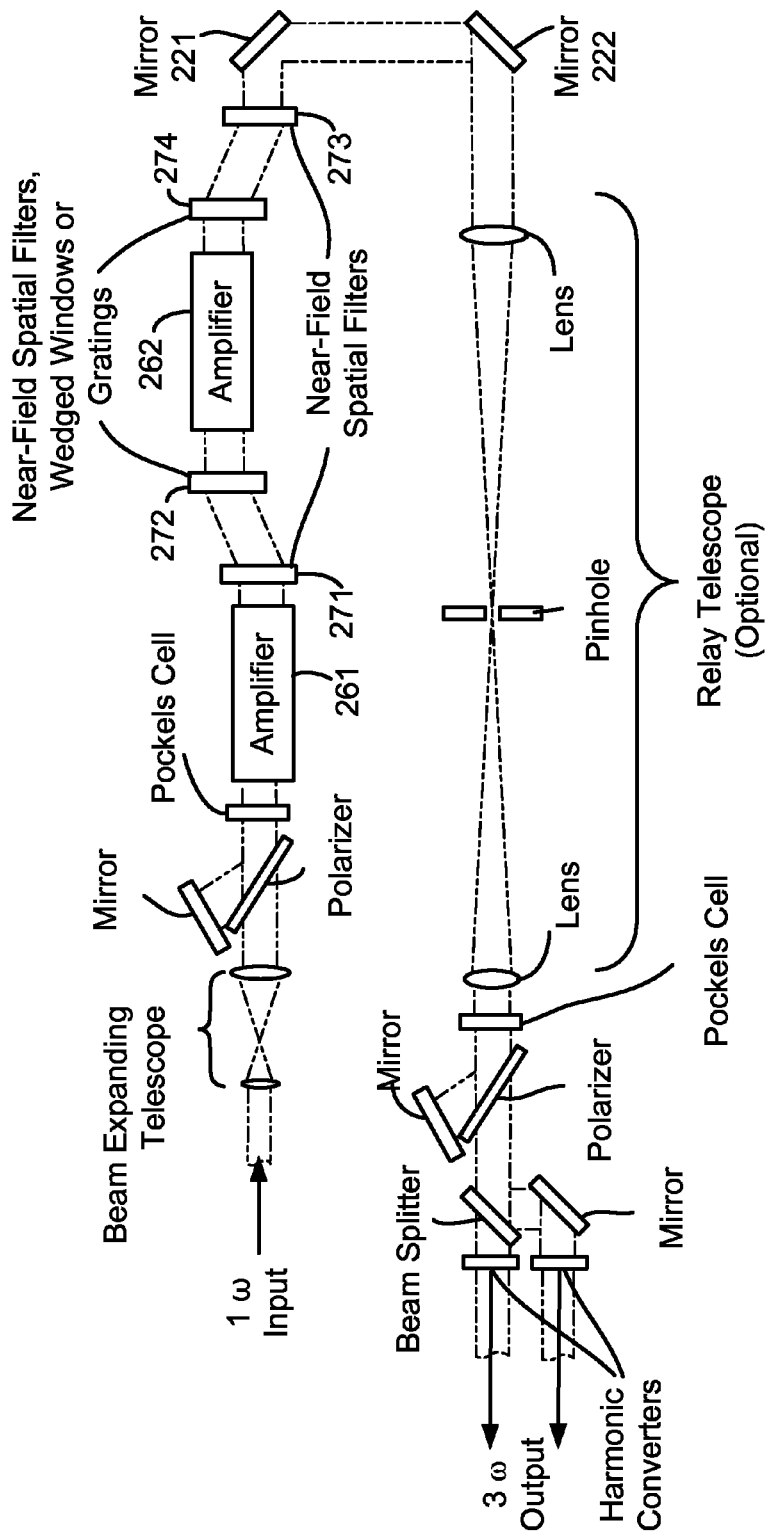
FIG. 2 is a simplified schematic diagram of a compact, multi-pass laser amplifier according to another embodiment of the present invention.

FIG. 2 is a simplified schematic diagram of a compact, multi-pass laser amplifier according to another embodiment of the present invention. The embodiment illustrated in FIG. 2 provides a linear, many-pass beamline using two amplifiers, two near-field spatial filters, additional components for making beam paths through the amplifiers parallel, and one spherical-lens relay telescope to provide the option of far-field spatial filtering. In comparison with FIG. 1A, the embodiment illustrated in FIG. 2 adds optical elements 272 and 274, which represent additional near-field spatial filters, wedged windows, planar gratings, or the like that are used to redirect the beam between the near-field spatial filters 271/

273 and amplifier 262. In this implementation, amplifier 262 is aligned parallel to amplifier 261. Such parallel alignment may offer mechanical advantages for assembling and packing beamlines together.

Referring to optical elements 272 and 274, these optical elements introduce an angle between the initial propagation direction of the beam and the propagation direction after passing through the optical elements. Because the beam is deflected at an angle by near-field spatial filter 271, if an amplifier were placed in this portion of the beam, the propagation of the beam at an angle will increase the lateral dimension of the optical structure in which the amplifier is mounted. Such an increase in size to accommodate the propagation distance at an angle can increase the cost of the system. Optical elements 272 and 274 change the direction of propagation of the light beam so that it is, for example, parallel to the original direction it had before it passed through near-field spatial filter 271. As illustrated in FIG. 2, amplifiers 261 and 262 are aligned to be parallel with respect to each other, providing reductions in complexity of the optical layout and size of the assembled components. Optical elements 272 and 274 can be near-field spatial filters (providing for additional filtering), wedged windows (e.g., prisms), gratings, or the like. In some embodiments, optical element 274 is not utilized and the angle of incidence at mirror 221 is adjusted to provide the desired propagation direction toward mirror 222.

Figure 3:
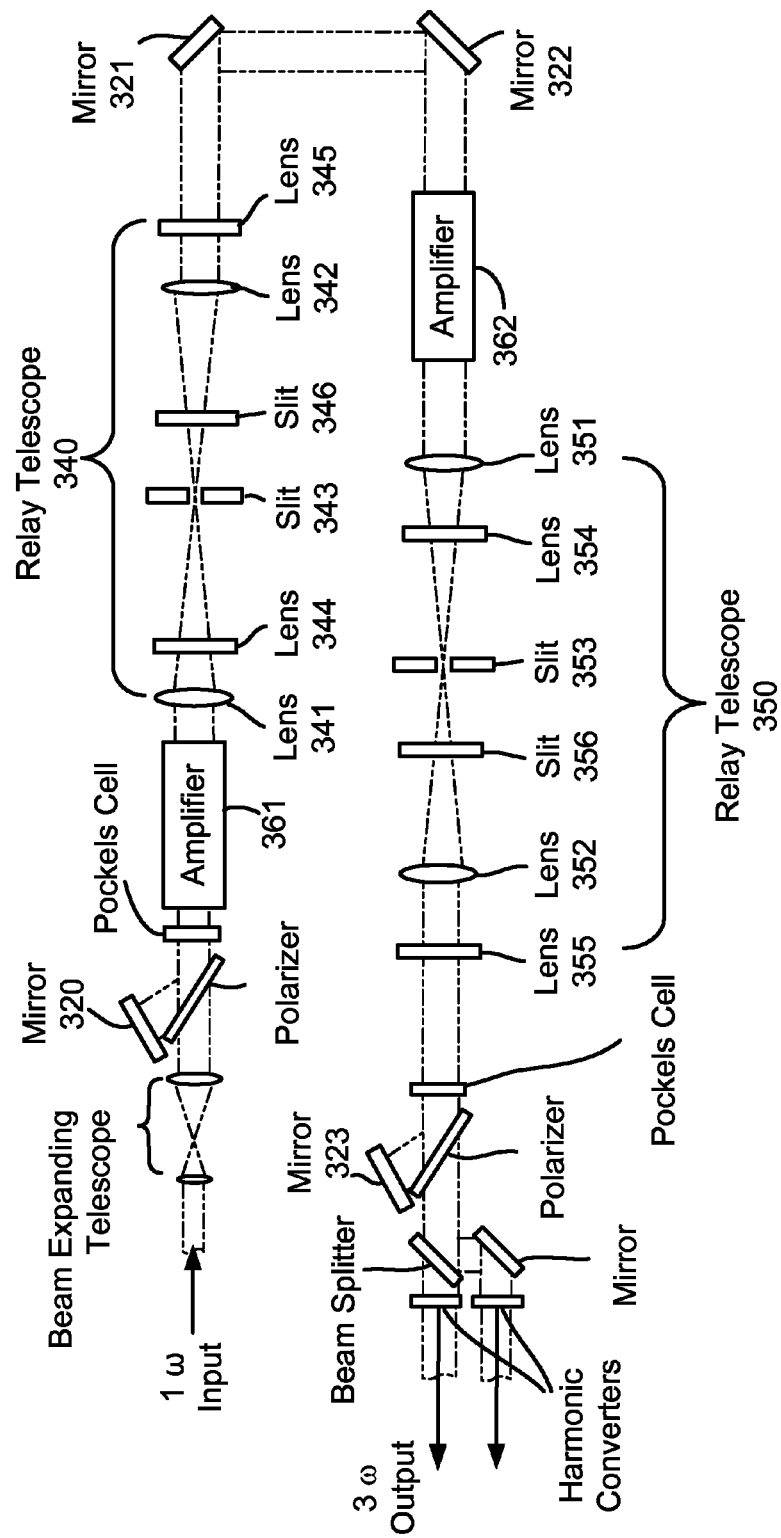
FIG. 3 is a simplified schematic diagram of a compact, multi-pass laser amplifier utilizing multiple relay telescopes according to an embodiment of the present invention.

FIG. 3 is a simplified schematic diagram of a compact, multi-pass laser amplifier utilizing multiple relay telescopes according to an embodiment of the present invention. The embodiment illustrated in FIG. 3 provides a linear, many-pass beamline using two amplifiers and two cylindrical-lens relay telescopes with far-field spatial filtering. In comparison with FIG. 1A, the embodiment illustrated in FIG. 3 replaces the near-field spatial filters with a cylindrical-lens relay telescope 340 as described in more detail below. Additionally, the spherical-lens relay telescope 150 has been replaced with a cylindrical-lens relay telescope 350. Both relay telescopes provide both far-field spatial filtering and image relaying.

Referring to FIG. 3, relay telescope 340 relays images from mirror 320 to a plane (i.e., a relay plane) perpendicular to the beam that is positioned before the beam encounters relay telescope 350. For example, this relay plane could be located between lens 345 and mirror 321, between mirrors 321 and 322, between mirror 322 and amplifier 362, within amplifier 362, or between amplifier 362 and lens 351. Relay telescope 350 relays the image from the relay plane to mirror 323. As described below, cylindrical lenses 341, 342, 344, and 345 in relay telescope 340 and cylindrical lenses 351, 352, 354, and 355 in relay telescope 350 are paired with slit filters 343 and 346 and slit filters 353 and 356, respectively. The slit filters can also be referred to as slit apertures. If the intensity of the beam at the edges of the slit filters is below the threshold for plasma generation or ablation of material, the beam can be passed repeated through the same slit filters, along the same path, without incurring detrimental "pinhole closure" effects (which in this case could be referred to as "slit closure" effects). In the absence of pinhole closure, the beam can be passed many times through the same slit filters and along the same path.

Functionally, the beamline performs in much the same manner as the embodiments illustrated in FIGS. 1 and 2. Those skilled in the art will recognize that other embodiments are possible, similar to those discussed above in reference to FIGS. 1 and 2 above. Such embodiments include, but are not limited to, use of adaptive optics and deformable mirrors to correct beam wavefront so that more passes might be taken; use of different configurations of the polarizer and Pockels cell switch, as discussed above, so that different polarizations can be injected and trapped in the cavity; addition of a 90-degree rotator between the amplifiers to effect compensation for depolarization produced in the amplifiers; removal of both Pockels cells and use of a half-wave plate near the injection point and a Faraday rotator elsewhere in the beam path to allow the beam to pass the amplifiers three times; and variations in the number of amplifier and spatial-filter stages, depending on the pulse energy and pulse duration specification.

Referring once again to FIG. 3, relay telescopes 340 and 350 are herein described in additional detail. The relay telescopes can also be referred to as far-field spatial filters. For purposes of clarity, the description below relates to relay telescope 340, but is also applicable to relay telescope 350. Relay telescope 340 includes two overlapping filter elements: a first filter element including a first cylindrical lens 341 and a second cylindrical lens 342; and a second filter element including a third cylindrical lens 344 and a fourth cylindrical lens 345. The first cylindrical lens 341 and the second cylindrical lens 342 are separated by a first distance $d_1$. Both the first cylindrical lens and the second cylindrical lens are characterized by a first focal length ($f_1$). The first filter element also includes a first slit filter 343 that is oriented in a horizontal configuration and positioned between the first cylindrical lens 341 and the second cylindrical lens 342. The first cylindrical lens 341 is oriented to focus light rays passing through the lens in a vertical plane and pass light rays with no focusing action in the horizontal plane. A plane wave passing through the first cylindrical lens 341 will form a slit shaped beam at the focal plane, which is aligned with the first slit filter 343. Preferably, the majority of the power in the slit shaped beam will pass through the first slit filter 343. The light passing through the first slit filter 343 diverges in the vertical plane and is collimated by the second cylindrical lens 342. The first filter element may be referred to as a vertical filter.

Relay telescope 340 also includes a second filter element that overlaps with the first filter element. The second filter element includes a third cylindrical lens 344 and a fourth cylindrical lens 345 separated by a second distance $d_2$. Both the third cylindrical lens 344 and the fourth cylindrical lens 345 are characterized by a second focal length ($f_2$). The second filter element also includes a second slit filter 346 that is oriented in a vertical configuration and positioned between the third cylindrical lens 344 and the fourth cylindrical lens 345. The third cylindrical lens 344 is oriented to focus light rays passing through the lens in a horizontal plane and pass light rays with no focusing action in the vertical plane. A plane wave passing through the third cylindrical lens 344 will form a slit shaped beam at the focal plane, which is aligned with the second slit filter 346. Preferably, the majority of the power in the slit shaped beam will pass through the second slit filter 346. The light passing through the second slit filter 346 diverges in the horizontal plane and is collimated by the fourth cylindrical lens 345. The second filter element may be referred to as a horizontal filter.

The distance between the first slit filter and the second slit filter is a predetermined distance g. Thus, the distance between line foci is equal to the predetermined distance g. The distance g determines the long dimension of the slit-shaped beams at the two slit filters, 343 and 346. Consequently, g also determines the beam intensity at these slit filters. In the embodiment illustrated in FIG. 3, the distance g is less than the focal length of the cylindrical lenses.

The relay telescopes illustrated in FIG. 3 provide for a particular version of image relaying in which a beam aspect ratio at the first cylindrical lens 341/351 is equal to the beam aspect ratio at the fourth cylindrical lens 345/355. Although embodiments of the present invention described in relations to FIGS. 1A, 2, 3, and 4 utilize relay telescopes including cylindrical lenses, this is not required by the present invention and relay telescopes including astigmatic lenses as illustrated by relay telescope 1200 in FIG. 12 can be utilized in conjunction with the amplifier systems described herein, particularly the systems described in relation to FIGS. 1A, 2, 3, and 4. Thus, illustration of relay telescopes with pinhole spatial filters or slit filters in particular implementations are not intended to limit the scope of the present invention, but are merely illustrated to demonstrate the variety of filtering mechanisms that can be utilized with embodiments of the present invention.

A specific embodiment of the present invention utilizes cylindrical lenses that are characterized by the same focal length, that is, $f_1=f_2=f$. In this embodiment, the distance $d_1$ is equal to 2f and the distance $d_2$ is equal to 2f and the distance between the first cylindrical lens and the fourth cylindrical lens is equal to 2f+g. In the illustrated configuration, the total relay distance is equal to 4f and the total relay distance outside the spatial filter is equal to 4f−2f−g=2f−g. Accordingly, this specific embodiment relays images without changing the beam aspect ratio. The relay telescopes illustrated in FIG. 3 should be regarded as exemplary, as embodiments in which the beam size is magnified, demagnified, or the beam aspect ratio is changed are also possible. For example, it will be appreciated that variations in the focal lengths can be provided in order to relay images and to provide a desired magnification or change in aspect ratio. One of ordinary skill in the art would recognize many variations, modifications, and alternatives.

The orientation of the first pair of cylindrical lenses is orthogonal to the orientation of the second pair of cylindrical lenses in each filter element. Additionally, the orientation of the first slit filter is orthogonal to the second slit filter. Thus, in the configuration illustrated in FIG. 3, the first filter element is orthogonal to the second filter element. Thus, the combination of cylindrical lenses and filters provide for spatial filtering of the light beam incident on the first cylindrical lens in both horizontal and vertical directions, but using slit filters characterized by reduced beam intensity at the filters. This contrasts with far-field spatial filters in which a pinhole is utilized, which will typically result in high beam intensities at the pinhole, thereby resulting in sputtering of pinhole materials, pinhole closure, and the like. The techniques described herein contrast with approaches using slit filters in which either: 1) only one filtering element is used, so that filtering occurs only in one direction; or 2) two filtering elements are used, but in a configuration in which the slit filters are not overlapped to accomplish image relaying. Additionally, embodiments of the present invention contrast with approaches using two spherical lenses that are tilted to impose astigmatism on the beam and two slit filters that are oriented orthogonally to each other. Specifically, embodiments of the present invention illustrated herein that use pairs of cylindrical lenses or astigmatic lenses effect much greater reductions in intensity at the slit filters, thereby allowing higher power beams to be filtered without generating beam-distorting or beam-absorbing plasma or causing ablation of material from the edges of the slit filters. Additional description related to relay telescopes with cylindrical lenses is found in commonly assigned U.S. patent application Ser. No. 12/544,988, entitled "Spatial filters for high average power lasers," filed on Aug. 20, 2009, the disclosure of which is hereby incorporated by reference in its entirety for all purposes.

Figure 12:
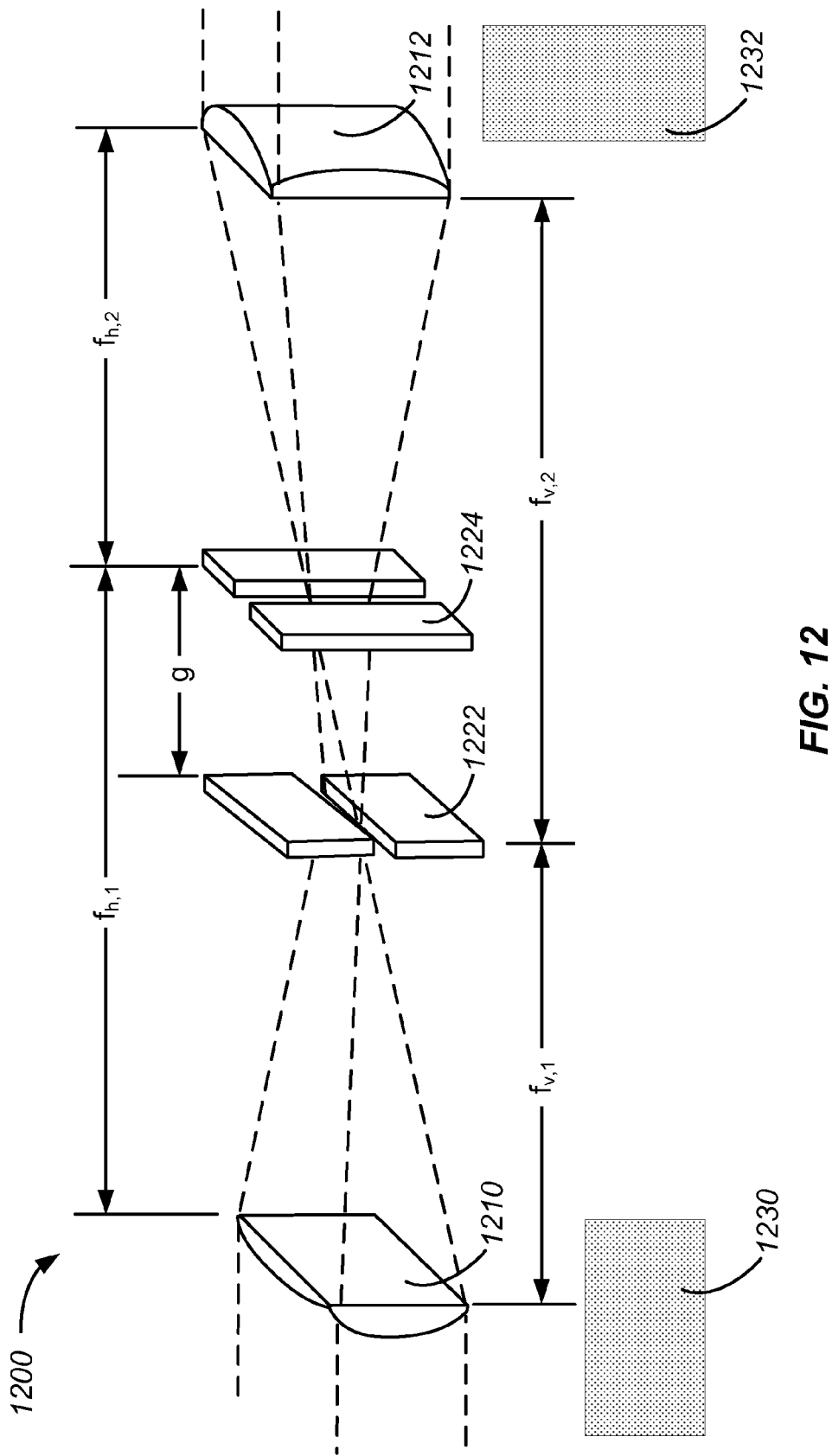
FIG. 12 is a simplified diagram of an astigmatic relay telescope according to an embodiment of the present invention.

In addition to the relay telescopes 340 and 350 illustrated in FIG. 3, a relay telescope in which the pairs of cylindrical lenses have been replaced with astigmatic lenses that have focusing power in both the vertical and horizontal directions can be utilized. FIG. 12 is a simplified diagram of an astigmatic relay telescope according to an embodiment of the present invention. This version of the relay telescope, which can be referred to as an astigmatic relay telescope is described in additional detail in U.S. patent application Ser. No. 12/544, 988 referenced above and is illustrated in FIG. 12. The astigmatic relay telescope 1200 includes a first astigmatic lens 1210 having a first focal length $f_{v,1}$ for focusing in the vertical direction and a second focal length $f_{h,1}$ for focusing in the horizontal direction, i.e., orthogonal to the vertical direction. In the example illustrated in FIG. 12, the vertical direction can be referred to as a first input direction and the horizontal direction can be referred to as a second input direction. The focal lengths for the two directions are different, with the focal length $f_{h,1}$ being greater than the focal length $f_{v,1}$.

A first slit filter 1222 is positioned along the optical path and separated from the first astigmatic lens 1210 by first focal length $f_{v,1}$. As illustrated in FIG. 12, the collimated beam incident on the first astigmatic lens is focused in the vertical direction, enabling the focused beam to pass through the first slit filter 1222. A second slit filter 1224 is also positioned along the optical path and separated from the first astigmatic lens by the second focal length $f_{h,1}$. The collimated beam incident on the first astigmatic lens is thus focused in the horizontal direction, enabling the focused beam to pass through the second slit filter 1224. The first slit filter 1222 and the second slit filter 1224 are separated by a distance g. As illustrated in FIG. 12, the first slit filter and the second slit filter are orthogonal to each other. The distance g is the difference in focal lengths in the two orthogonal directions, $f_{h,1}$ and $f_{v,1}$.

As the beams pass through the first and second slit filters 1222 and 1224, the beams diverge until reaching a second astigmatic lens 1212 having a third focal length $f_{v,2}$ for the first input (e.g., vertical) direction and a fourth focal length $f_{h,2}$ for the second input (e.g., horizontal) direction. The focal lengths for the two direction are different, with the focal length $f_{h,2}$ being less than the focal length $f_{v,2}$. The beam is collimated by the second astigmatic lens 1212.

The astigmatic relay telescope illustrated in FIG. 12 provides for image relaying when the focal lengths $f_{h,2}$ and $f_{v,1}$ are equal, and when the focal lengths $f_{v,2}$ and $f_{h,1}$ case, the total relay distance R is:

$$R=(1-m^2)t+(1-m)L,$$

where $m=f_{v,2}/f_{v,1}=f_{h,1}/f_{h,2}$, $L=f_{v,1}+f_{v,2}=f_{h,1}+f_{h,2}$, and t is the distance between the input image plane and the first lens 1210. In both these equations for m and L, the focal lengths are different in the vertical and horizontal directions.

The astigmatic relay telescope 1200 illustrated in FIG. 12 provides image relaying. Although the cross-sectional areas of the input and output beams are equal in FIG. 12, the beam dimensions are altered, with the input beam having a beam cross-section 1230 oriented with a long direction being horizontal and the output beam having a beam cross-section 1232 oriented with a long direction being vertical. It should be noted that when the input beam is square, the output beam is also square. Moreover, although the lenses illustrated in FIG. 12 are rectangular (e.g., square), embodiments of the present invention may utilize round lenses or lenses of other shapes as appropriate to the particular application. One of ordinary skill in the art would recognize many variations, modifications, and alternatives.

Thus, embodiments of the present invention can utilize a variety of relay telescopes including ones with spherical lenses and a pinhole, cylindrical lenses and slit filters, and astigmatic lenses and slit filters. Illustration of a particular relay telescope in the figures described herein is not intended to limit the scope of the present invention and the various relay telescopes illustrated in the figures can be replaced by other types of relay telescopes as appropriate to the particular application.

Figure 4:
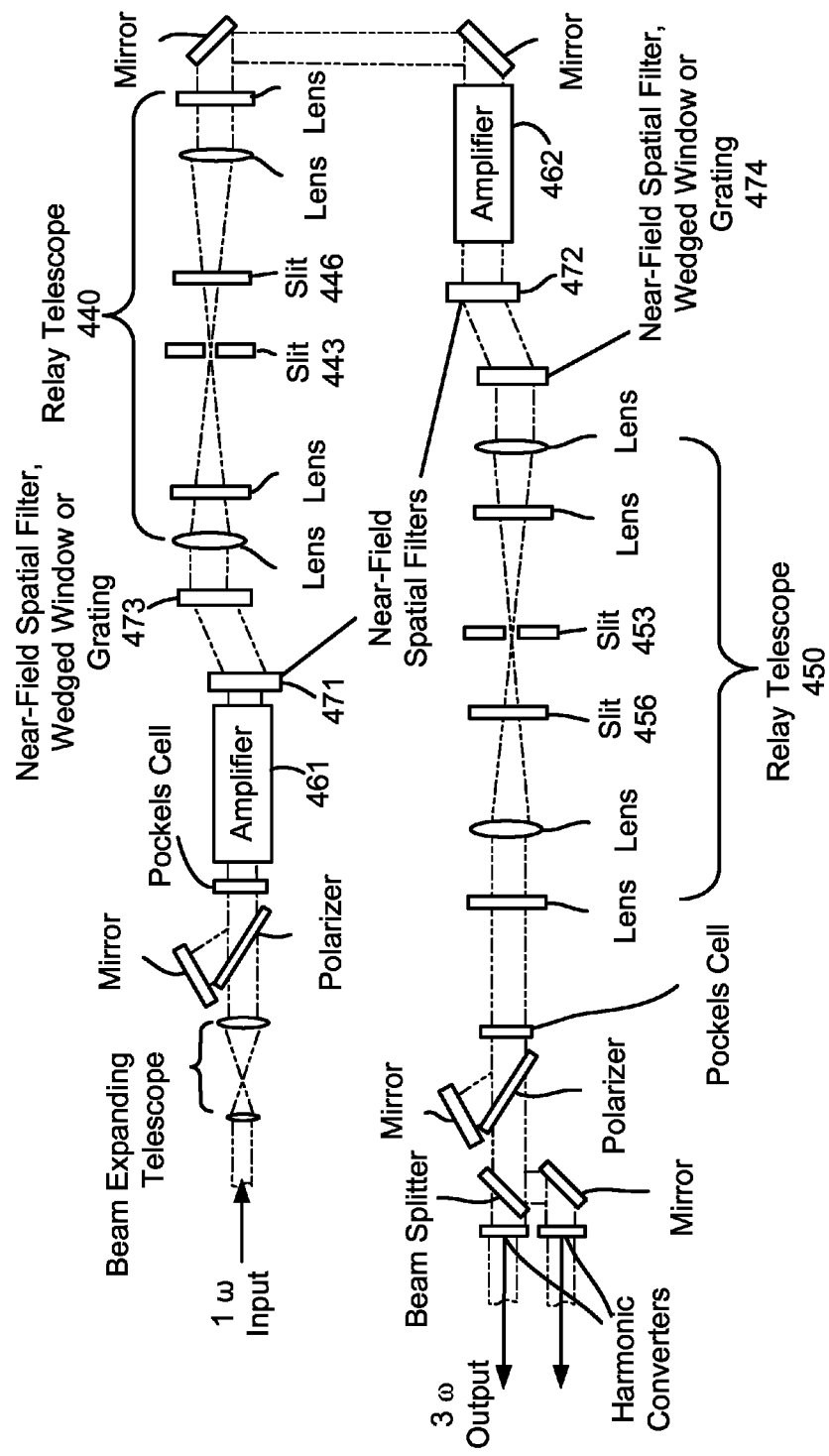
FIG. 4 is a simplified schematic diagram of a compact, multi-pass laser amplifier utilizing multiple relay telescopes according to another embodiment of the present invention.

FIG. 4 is a simplified schematic diagram of a compact, multi-pass laser amplifier utilizing multiple relay telescopes according to another embodiment of the present invention. In the embodiment illustrated in FIG. 4, a linear, many-pass beamline is provided that uses two amplifiers, two near-field spatial filters, additional components for making beam paths through the amplifiers parallel, and two cylindrical-lens relay telescopes to provide the option of far-field spatial filtering. In comparison with FIG. 3, the embodiment illustrated in FIG. 4 adds near-field spatial filters 471 and 472 as well as optics 473 and 474 that serve to make the long beam paths through relay telescopes 440 and 450 parallel to the beam paths through amplifiers 461 and 462. The embodiment illustrated in FIG. 4 provides an architecture with a simplified mechanical design and with improved beamline packing.

The addition of near-field spatial filters 471 and 472 reduces the beam intensity at the edges of the slit filters 443, 446, 453, and 456, reducing the likelihood and effects of pinhole closure (and its equivalent for slits) and material ablation. As illustrated in FIG. 4, near-field spatial filters 471 and 472 reduce the intensity at the slit filters when the beam propagates from the input end of the cavity toward the output end, so that the intensity is reduced on the last pass through the system, when the beam energy is the greatest. One of ordinary skill in the art will appreciate that additional near-field spatial filters can be added to reduce the intensity at the slit filters when the beam propagates in the opposite direction as well.

Figure 5A:
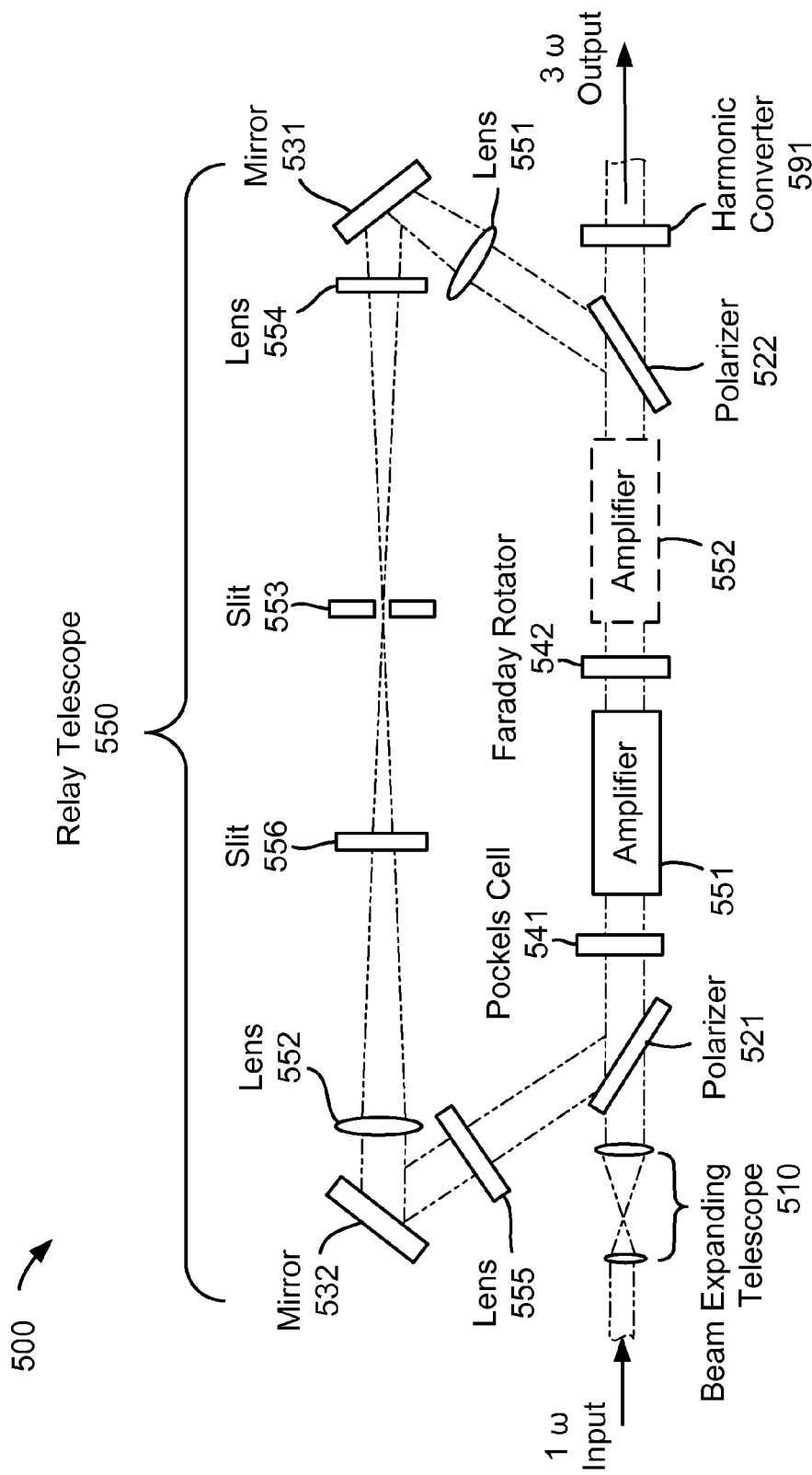
FIG. 5A is a simplified schematic diagram of a closed-loop, multi-pass laser amplifier according to an embodiment of the present invention.

FIG. 5A is a simplified schematic diagram of a closed-loop, multi-pass laser amplifier 500 according to an embodiment of the present invention. The embodiment illustrated in FIG. 5A provides a closed-loop, many-pass beamline using two amplifiers and one cylindrical-lens relay telescope to provide for far-field spatial filtering. The initial laser pulse is injected through the beam expanding telescope 510, which can be considered an input aperture for the laser amplifier. In the illustrated embodiment, the input light is injected in the p-polarization state. However, injection in the s-polarization state, with accompanying changes in appropriate optical elements, is included within the scope of the present invention.

The input beam is transmitted through polarizer 521, which has a transmission axis aligned with the polarization state of the input beam (i.e., the p-polarization state) and is then incident on Pockels cell 541, which is operating in a first state at a low voltage (i.e., the "off" state) such that transmission through Pockels cell 541 does not result in rotation of the beam's polarization. The beam is amplified as it passes through amplifier 551 (also referred to as an optical gain element) and is then transmitted through Faraday rotator 542, which rotates the beam polarization by 90° to effect compensation for depolarization produced by the amplifiers. The Faraday rotator is representative of any 90° rotator and other suitable polarization rotation devices including a half-wave plate, an active quartz rotator, or the like are included within the scope of the present invention. After passing through the Faraday rotator 542, the beam is polarized in the s-polarization state.

After passing through optional amplifier 552, the beam reflects from polarizer 522, which is oriented with the transmission axis aligned with the polarization state of the initial input light (i.e., the p-polarization) and is incident on the first lens 551 of relay telescope 550. Relay telescope 550 provides far-field spatial filtering, with two overlapping, cylindrical-lens spatial filters with orthogonal silts. Mirrors 531 and 532 are placed within relay telescope 550, to allow the overall length of the telescope to be increased to approximately one-half the total beam-path length in the closed-loop cavity, to effect image relaying. After passing through relay telescope 550, the beam, which is polarized in the s-polarization state, is reflected off of polarizer 521 and is incident on Pockels cell 541.

After the initial pass through the Pockels cell, a controller (as discussed in relation to FIG. 5B), is utilized to change the operating state of Pockels cell 541 in order to operate the Pockels cell at high voltage so that it is in the "on" state. Operating in this second state, the polarization state of the light transmitted through the Pockels cell is rotated by 90° as is passes through the Pockels cell. While the Pockels cell is maintained in the "on" state, the beam is trapped in the closed loop cavity since Pockels cell 541 rotates the polarization to the p-polarization state, Faraday rotator 542 rotates the polarization to the s-polarization state, and the light is thereby reflected off of polarizer 522. As illustrated in FIG. 5A, a closed optical loop is formed that receives light reflected from polarizer 522 and directs light to impinge on polarizer 521. The beam makes a predetermined number of round trips through the closed loop and is amplified on each round trip. On the last pass, the controller changes the operating state of Pockels cell 541 to the first state (i.e., the "off" state at low voltage) and the beam passes through Pockels cell 541 without polarization rotation. The beam is amplified by amplifier 551, the polarization is rotated to the p-polarization state by Faraday rotator 542, is optionally further amplified by amplifier 552, and is then transmitted through polarizer 522 since the p-polarized beam is aligned with the transmission axis of the polarizer. The beam then continues on to optional harmonic converter stage 591 and exits the amplifier system.

Figure 5B:
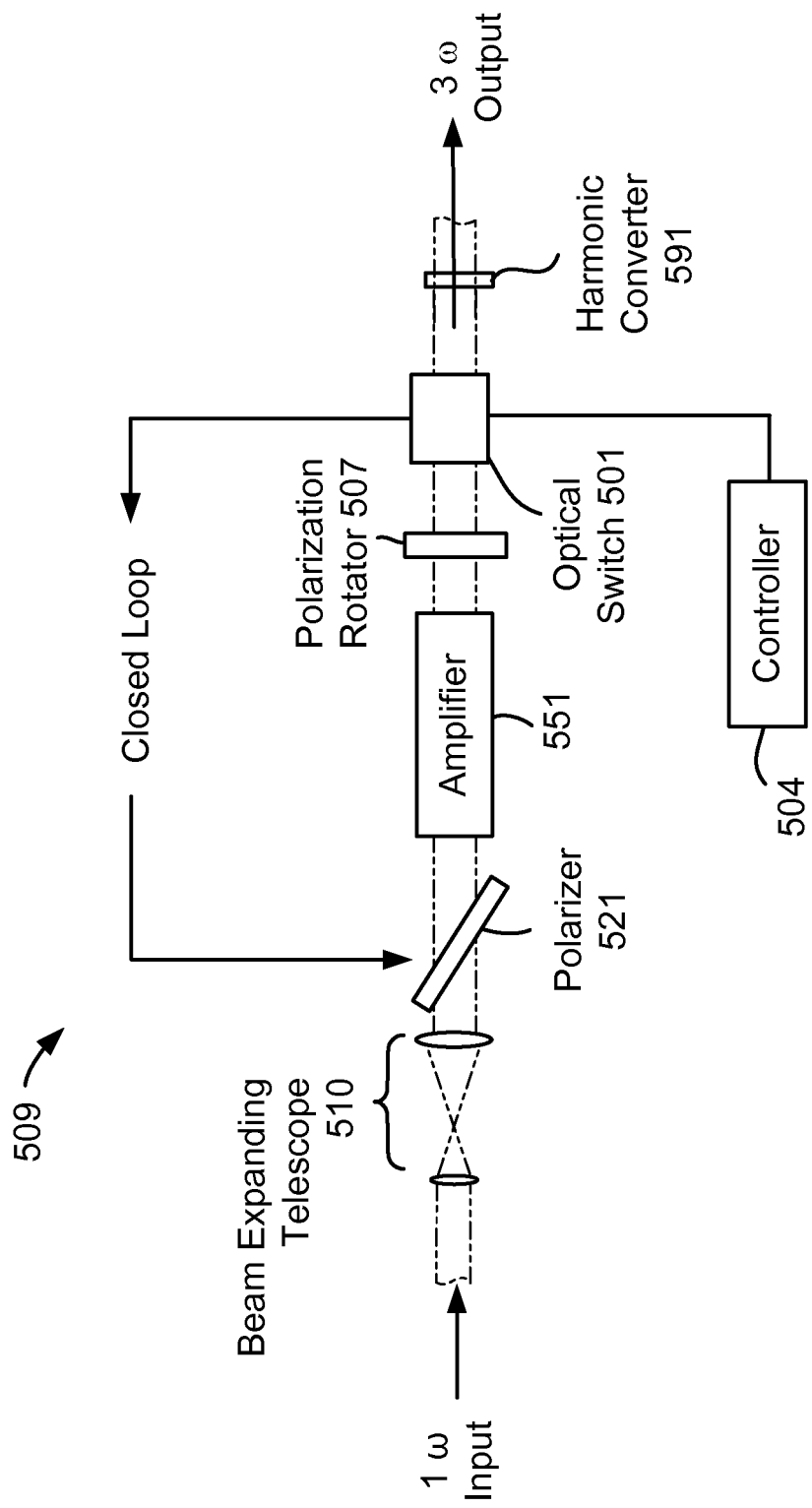
FIG. 5B is a simplified block diagram of a laser amplifier according to an embodiment of the present invention.

As described more fully in relation to FIG. 5B, Pockels cell 541 and polarizer 522 form an optical switch having two states. Amplifier 551 and optional amplifier 552 are inserted in the optical path between the elements of the optical switch. In the embodiment illustrated in FIG. 5A, the amplifiers are positioned between the Pockels cell and the polarizer so that the Pockels cell does not have to experience the full output fluence of the beam. In other embodiments with a Pockels cell suitable for operation at the highest fluence of the optical amplifier, the Pockels cell could be positioned adjacent to polarizer 522. Conceptual placement of the Pockels cell adjacent to the polarizer can be a tool useful in gaining a better understanding of the operation of the optical switch since the polarization change effected by Pockels cell 541 causes light to either reflect from or pass through polarizer 522, thereby either injecting the light into the closed loop or passing the light out of the amplifier system.

Referring to FIG. 5A, the closed loop amplifier system 500 utilizes only a single Pockels cell. Provided that the intensity of the beam at the edges of the apertures of the slit filters is below the threshold for plasma generation or ablation of material, the beam can be passed repeated through the same slit filters, along the same path, without incurring detrimental "pinhole closure" effects. Thus, embodiments of the present invention provide multi-pass amplifier systems utilizing a single Pockels cell, which can be located at a position along the optical path that is exposed to a lower fluence than the final fluence associated with the amplifier system.

FIG. 5B is a simplified block diagram of a laser amplifier 509 according to an embodiment of the present invention. The laser amplifier includes an input aperture operable to receive laser radiation having a first polarization. In the illustrated embodiment, the input aperture can be an input aperture of the beam expanding telescope 510 or an input aperture of polarizer 521. The laser amplifier also includes an output aperture coupled to the input aperture by an optical path. In the illustrated embodiment, the optical path extends along a straight line, but this is not required by the present invention.

Polarizer 521 is disposed along the optical path and has a transmission axis aligned with the first polarization. As the laser radiation is incident on polarizer 521, it is passed through the polarizer along the optical path. The amplifier also includes an optical gain element illustrated by amplifier 551, a polarization rotator 507 (e.g., a Faraday rotator), and an optical switch 501 disposed along the optical path. The optical switch is operable to pass the laser radiation when the optical switch is operated in a first state and to reflect the laser radiation when it is operated in a second state. A controller 504 is provided to change the operating state of the optical switch. In an embodiment, the optical switch includes a Pockels cell and a second polarizer having a transmission axis aligned with a second polarization orthogonal to the first polarization. As discussed in relation to FIG. 5A, in one embodiment, the Pockels cell is "off" in the first state and the Pockels cell is "on" in the second state. In the "off" state, the laser radiation passes through the optical switch experiencing no change in polarization state. In the "on" state, the laser radiation passes through the optical switch experiencing a 90° rotation of its polarization state.

Although optical switch 501 is illustrated as a single element, one of ordinary skill in the art will appreciate that the optical switch includes multiple optical elements, which may be positioned at several locations along the optical path. In the embodiment illustrated in FIG. 5A, Pockels cell 541 is positioned upstream of amplifier 551 so that the light passes through the Pockels cell in the "off" state prior to the last amplification pass. In alternative embodiments, Pockels cell 541 could be positioned downstream of amplifier 551 in a position adjacent to polarizer 522. In a similar manner, the polarization rotator 507 could be positioned adjacent polarizer 521. Thus, the various optical elements can be positioned at various locations and the illustrated embodiments are not intended to limit the scope of the present invention, but merely to provide exemplary arrangements. Moreover, additional optical gain elements or amplifiers can be utilized in conjunction with the illustrated amplifier.

As illustrated in FIG. 5A, the input aperture can be an aperture of a beam expanding telescope optically coupled to polarizer 521 and the output aperture can be an aperture of an element of optical switch 501 or of harmonic converter 591.

Figure 6:
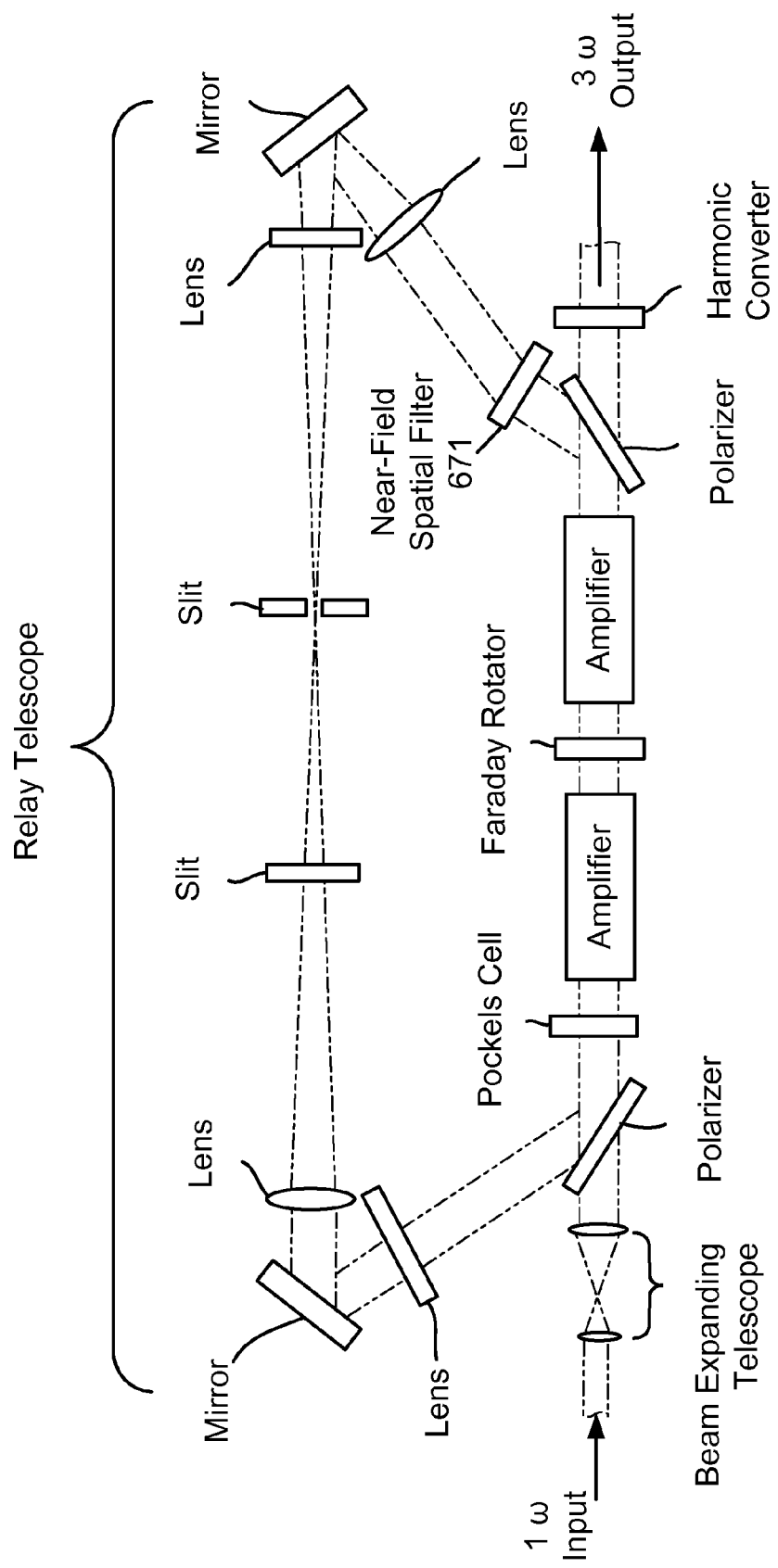
FIG. 6 is a simplified schematic diagram of a closed-loop, multi-pass laser amplifier according to another embodiment of the present invention.

FIG. 6 is a simplified schematic diagram of a closed-loop, multi-pass laser amplifier according to another embodiment of the present invention. The embodiment illustrated in FIG. 6 provides a closed-loop, many-pass beamline using two amplifiers, one near-field spatial filter, and one cylindrical-lens relay telescope to provide for far-field spatial filtering. In comparison with the amplifier system illustrated in FIG. 5, the embodiment illustrated in FIG. 6 includes near-field spatial filter 671, which provides additional spatial filtering to reduce or eliminate pinhole closure effects.

Figure 7:
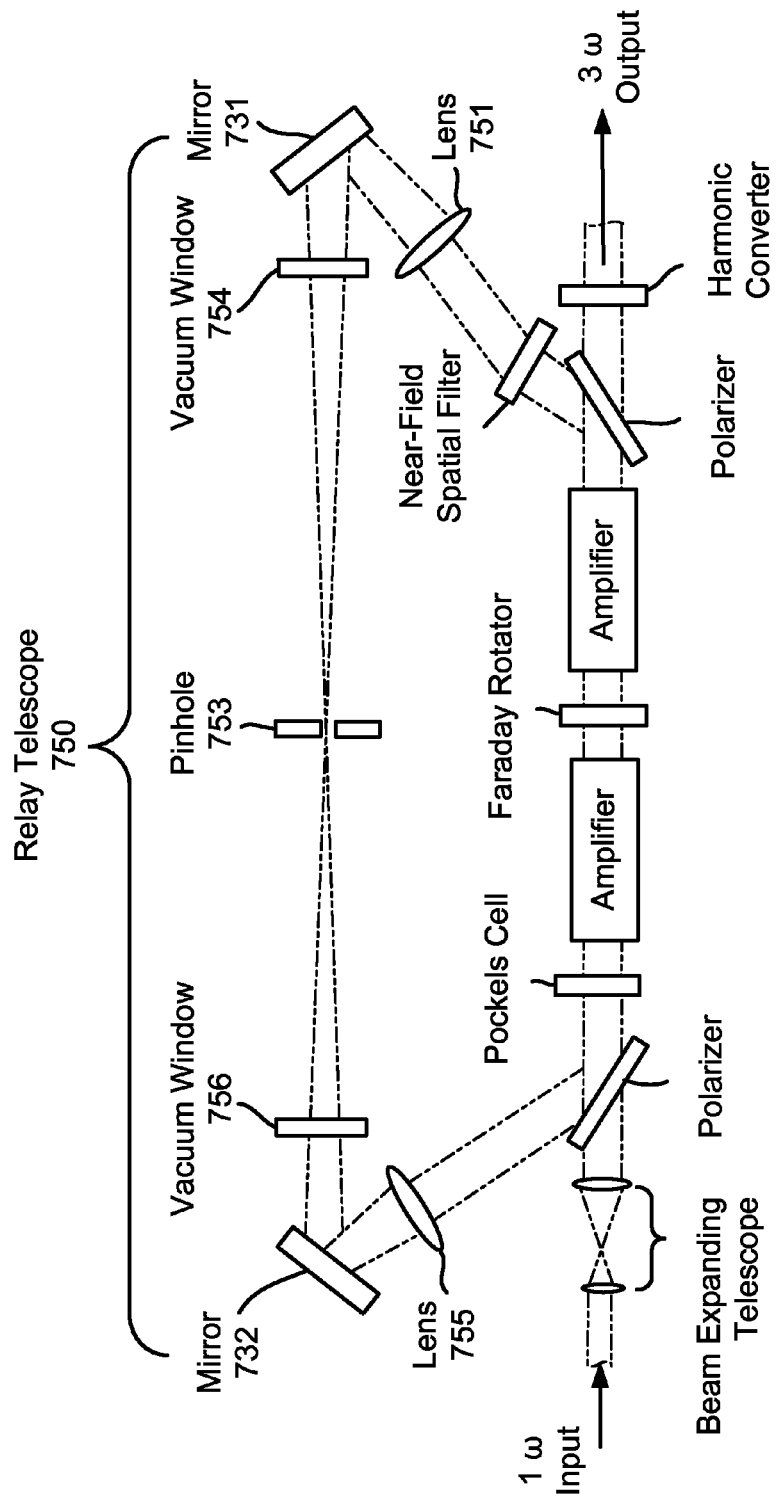
FIG. 7 is a simplified schematic diagram of a closed-loop, multi-pass laser amplifier utilizing a relay telescope according to an embodiment of the present invention.

FIG. 7 is a simplified schematic diagram of a closed-loop, multi-pass laser amplifier utilizing a relay telescope according to an embodiment of the present invention. In the embodiment illustrated in FIG. 7, a closed-loop, many-pass beamline is provided using two amplifiers, one near-field spatial filter, and an optional spherical-lens relay telescope to provide for far-field spatial filtering. In comparison with FIG. 6, the embodiment illustrated in FIG. 7 utilizes a spherical lens relay telescope 750 in place of the cylindrical lens relay telescope. The spherical lens relay telescope includes lens 751, pinhole 753, and lens 755. Lenses 751 and 755 are placed opposite mirrors 731 and 732 with respect to pinhole 753. Using a spherical lens relay telescope increases the risk of pinhole closure, but provides advantages including greater simplicity. Additionally, vacuum windows 754 and 756 are utilized to provide a reduced pressure atmosphere in the vicinity of pinhole 753, further reducing the risk of pinhole closure.

In other embodiments, the relay telescope(s) in the closed-loop path magnify one or both beam transverse dimensions on each pass. Magnifying the beam between passes has the advantage of reducing beam divergence caused by optical aberrations and of reducing the spatial frequencies of such aberrations so that the remaining aberrations are more easily correctable. Additionally, the input beam injected at polarizer 521 can have a smaller transverse dimension, so as to reduce the transverse dimension and cost of the output lens of the beam-expanding telescope 510, or the beam-expanding telescope 510 might be eliminated altogether.

Figure 8:
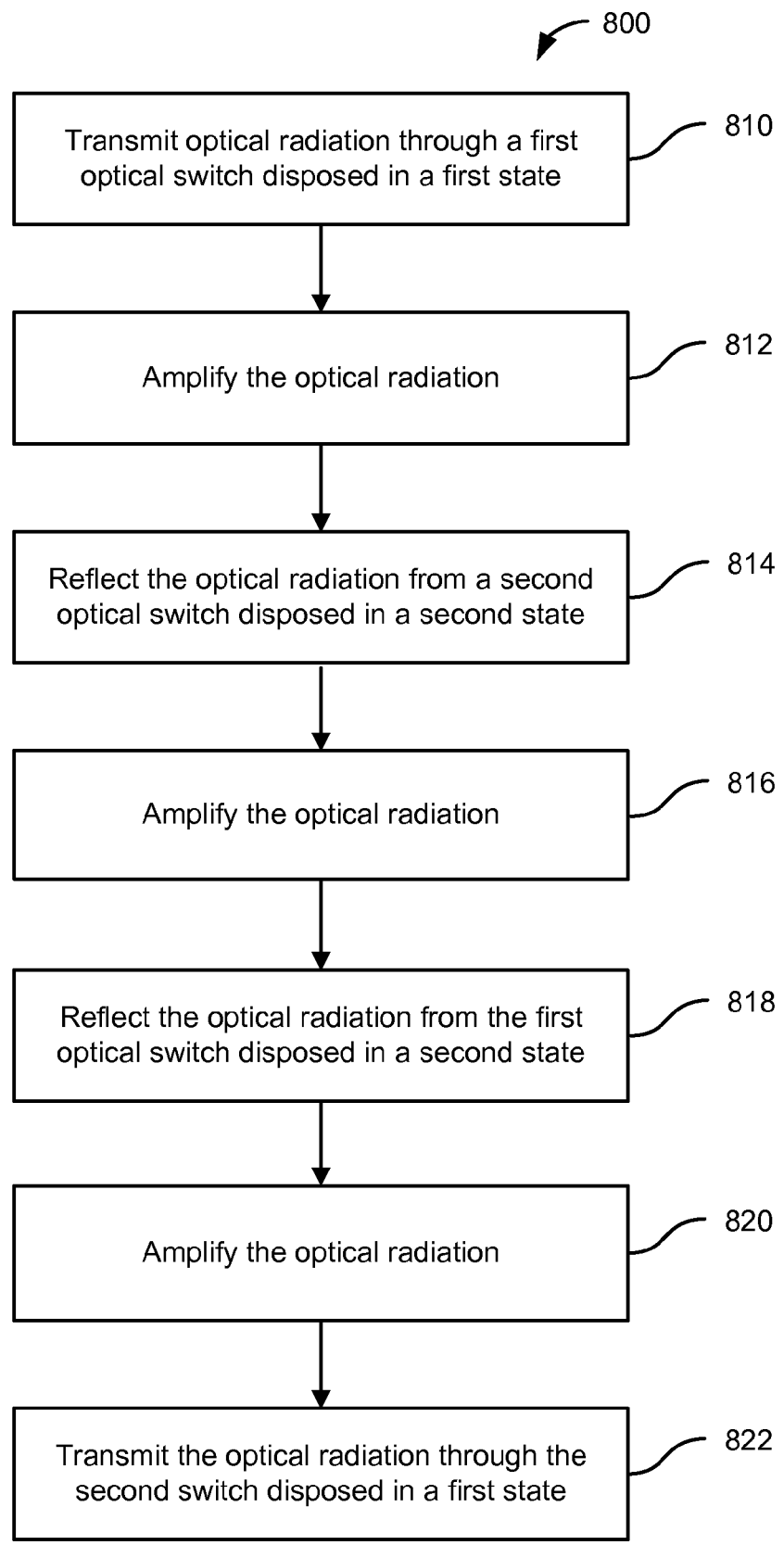
FIG. 8 is a simplified flowchart illustrating a method of amplifying a pulsed laser beam according to an embodiment of the present invention.

FIG. 8 is a simplified flowchart illustrating a method of amplifying a pulsed laser beam according to an embodiment of the present invention. The method 800 includes transmitting optical radiation associated with the pulsed laser beam through a first optical switch disposed in a first state (810) and amplifying the optical radiation (812). The first optical switch, in an embodiment, includes a polarizer, a Pockels cell, and a mirror. Operating in the first state, the first optical switch transmits the optical radiation with little to no change in polarization so that the polarizer, which has a transmission axis aligned with the polarization state of the optical radiation (e.g., a first polarization state), passes the optical radiation with little to no reflection. Amplification of the optical radiation can include the use of a single optical gain element (i.e., amplifier) or two or more optical gain elements disposed along the optical path of the optical radiation.

The method also includes reflecting the optical radiation from a second optical switch disposed in a second state (814) and amplifying the optical radiation (816). Like the first optical switch, the second optical switch can include a polarizer, a Pockels cell, and a mirror. In some embodiments, the optical radiation is spatially filtered before it is reflected from the second optical switch disposed in the second state. As an example, the spatially filtering can include transmission through a near-field spatial filter such as a volume Bragg grating or transmission through a relay telescope that provides far-field spatial filtering.

The method further includes reflecting the optical radiation from the first optical switch disposed in a second state (818), amplifying the optical radiation (820), and transmitting the optical radiation through the second optical switch disposed in a first state (822). In embodiments in which the first optical switch includes a Pockels cell, when the Pockels cell is operated in the second state, the Pockels cell converts light in the first polarization state into light in a second polarization state orthogonal to the first state.

It should be appreciated that the specific steps illustrated in FIG. 8 provide a particular method of amplifying a pulsed laser beam according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
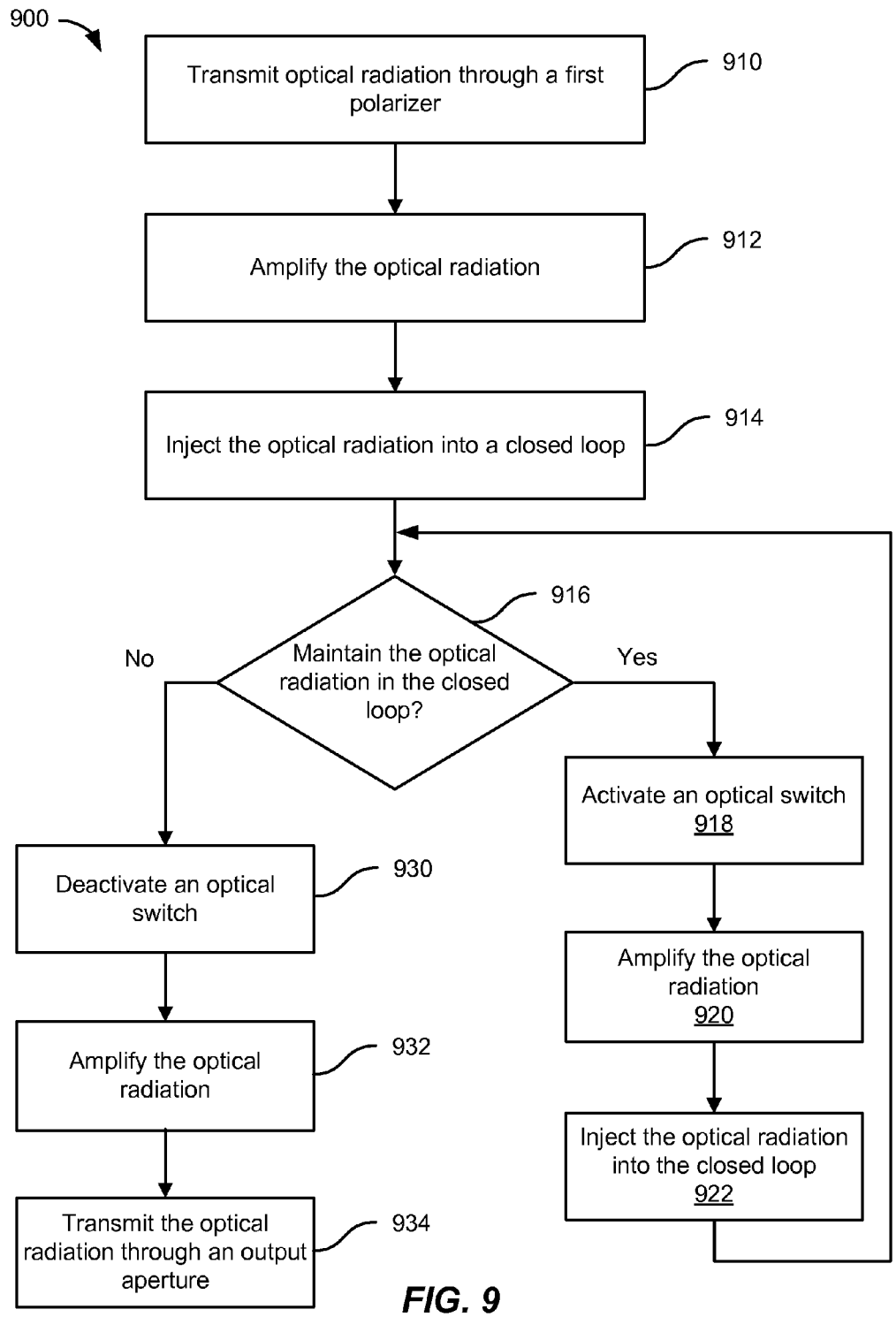
FIG. 9 is a simplified flowchart illustrating a method of amplifying a pulsed laser beam according to another embodiment of the present invention.

FIG. 9 is a simplified flowchart illustrating a method of amplifying a pulsed laser beam according to another embodiment of the present invention. The method 900 includes transmitting the optical radiation associated with the pulsed laser beam through a first polarizer (910), amplifying the optical radiation (912), and injecting the optical radiation into a closed loop (914). In an embodiment, the optical radiation has a first polarization state and the first polarizer has a transmission axis aligned with the first polarization state. As described in relation to FIG. 5A, a polarization rotation device can be utilized to rotate the polarization of the light transmitted through the first polarizer so that the optical radiation into the closed loop can be performed by reflecting the optical radiation off a second polarizer having a transmission axis aligned with the first polarization state. The closed loop can include a relay telescope to perform far-field spatial filtering, a near-field spatial filter, combinations thereof, or the like.

The method also includes determining that the optical radiation is to be maintained in the closed loop (916), activating an optical switch (918), amplifying the optical radiation (920), and injecting the optical radiation into the closed loop (922). In exemplary embodiments, activating the optical switch includes applying a bias voltage to a Pockels cell, thereby placing the Pockels cell in an "on" state. The optical radiation can be maintained in the closed loop for multiple passes by maintaining the optical switch in the activated state (i.e., the "on" state). Therefore, step 918 includes both the initial activation of the optical switch as well as maintenance of the optical switch in the activated state.

The method further includes determining that the optical radiation is not to be maintained in the closed loop (916), deactivating the optical switch (930), amplifying the optical radiation (932), and transmitting the optical radiation through an output aperture (934). The optical radiation can be transmitted through a second polarizer prior to being transmitted through the output aperture. In exemplary embodiments, deactivating the optical switch includes changing the operating state of the Pockels cell such that no substantial change in a polarization state of the optical radiation results from transmitting the optical radiation through the Pockels cell (i.e., placing the Pockels cell in the "off" state).

Referring to FIG. 5A, in the illustrated embodiment, the optical radiation enters at the fundamental frequency in the p-polarization state and passes through polarizer 521. The Pockels cell 541 is initially off so that no change in the polarization state of the optical radiation is associated with transmission through Pockels cell 541. Faraday rotator 542 rotates the polarization of the beam by 90°, so that the beam is in the s-polarization state and reflects off of polarizer 522 to enter the closed optical loop. By the time the pulse reflects off of polarizer 521 as it exits the closed optical loop for the first time, the state of Pockels cell 541 has been changed to a second state so that the polarization of the beam is rotated by 90° during transmission through the Pockels cell. The Faraday rotator then adds another 90° of rotation so that the beam is in the s-polarization state when it impinges on polarizer 522 for the second time. Pockels cell 541 is maintained in the second state until the decision is made to switch the amplified pulse out of the amplifier system. When the determination is made that the optical radiation is not to be maintained in the closed loop (916), the Pockels cell is returned to the first state so that no polarization rotation occurs during transmission through the Pockels cell and the beam is in the p-polarization state when it impinges on polarizer 522, where it exits towards the harmonic converter 591.

It should be appreciated that the specific steps illustrated in FIG. 9 provide a particular method of amplifying a pulsed laser beam according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
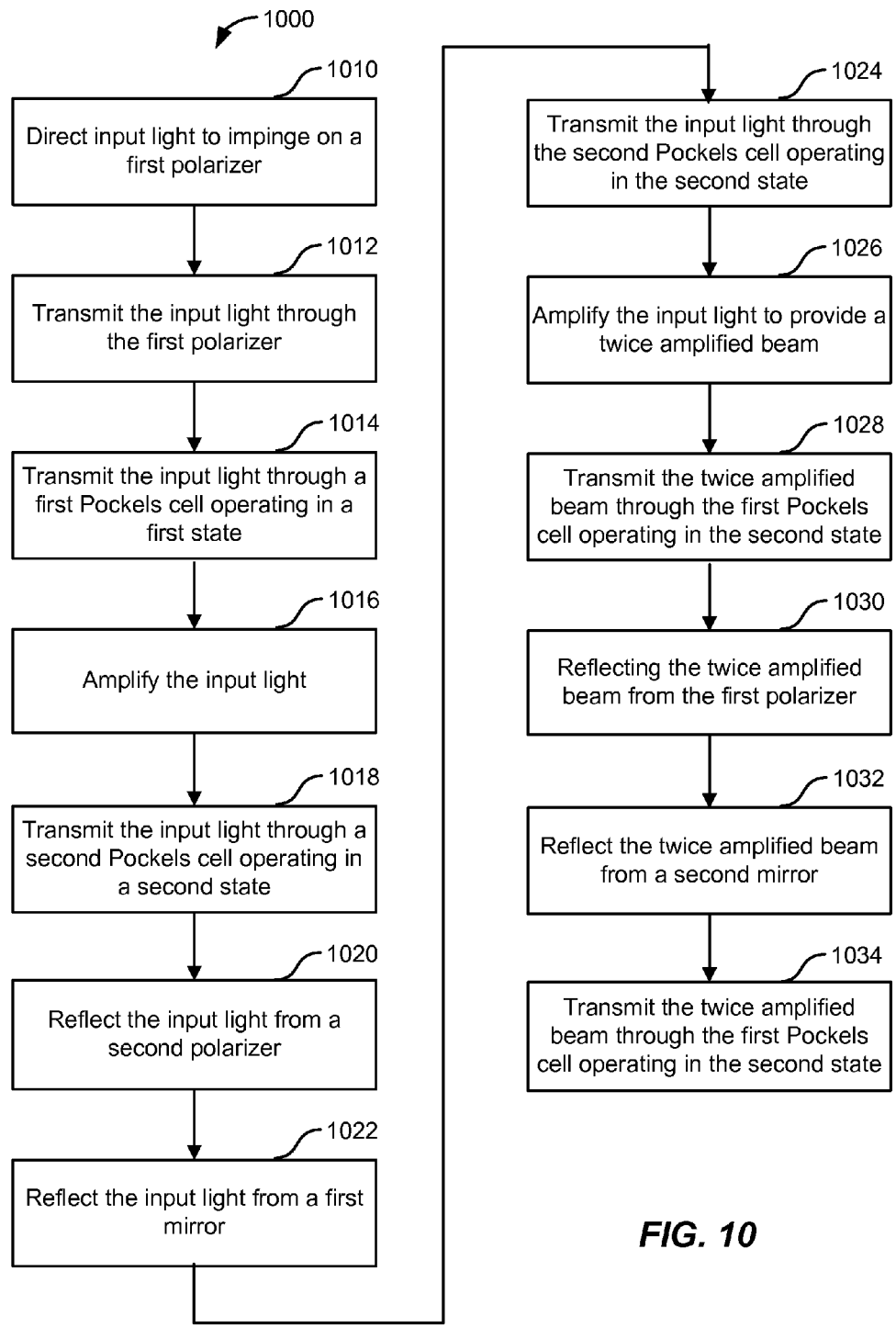
FIG. 10 is a simplified flowchart illustrating a method of amplifying a pulsed laser beam using the laser amplifier illustrated in FIG. 1A according to an embodiment of the present invention.

FIG. 10 is a simplified flowchart illustrating a method of amplifying a pulsed laser beam using the laser amplifier illustrated in FIG. 1A according to an embodiment of the present invention. The pulsed laser beam provides input light that has a first polarization state aligned with a first polarization axis. The method 1000 includes directing the input light to impinge on a first polarizer having a transmission axis aligned with the first polarization axis (1010), transmitting the input light through the first polarizer (1012), transmitting the input light through a first Pockels cell operating in a first state (1014), and amplifying the input light (1016). Amplifying the input light may include the use of multiple optical gain elements. Thus several amplification stages may be included within the scope of the process of amplifying the input light.

The method also includes transmitting the input light through a second Pockels cell operating in a second state (1018), reflecting the input light from a second polarizer having a transmission axis aligned with the first polarization axis (1020), reflecting the input light from a first mirror (1022), and transmitting the input light through the second Pockels cell operating in the second state (1024). Transmitting the input light through the second Pockels cell operating in the second state can include converting the input light from a first polarization state aligned with the first polarization axis to a second polarization state aligned with a second polarization axis orthogonal to the first polarization axis.

The method further includes amplifying the light to provide a twice amplified beam (1026), transmitting the twice amplified beam through the first Pockels cell operating in the second state (1028), and reflecting the twice amplified beam from the first polarizer (1030). Additionally, the method includes reflecting the twice amplified beam from a second mirror (1032) and transmitting the twice amplified beam through the first Pockels cell operating in the second state (1034). Transmitting the twice amplified beam through the first Pockels cell operating in the second state can include converting the twice amplified beam from a first polarization state aligned with the first polarization axis to a second polarization axis orthogonal to the first polarization axis.

In some embodiments, the method further includes amplifying the twice amplified beam to provide a three times amplified beam, transmitting the three times amplified beam through the second Pockels cell operating in the first state, and transmitting the three time amplified beam through the second polarizer. The method can also include transmitting the amplified input light through a near-field spatial filter or transmitting the amplified input light through a relay telescope.

It should be appreciated that the specific steps illustrated in FIG. 10 provide a particular method of amplifying a pulsed laser beam according to an embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
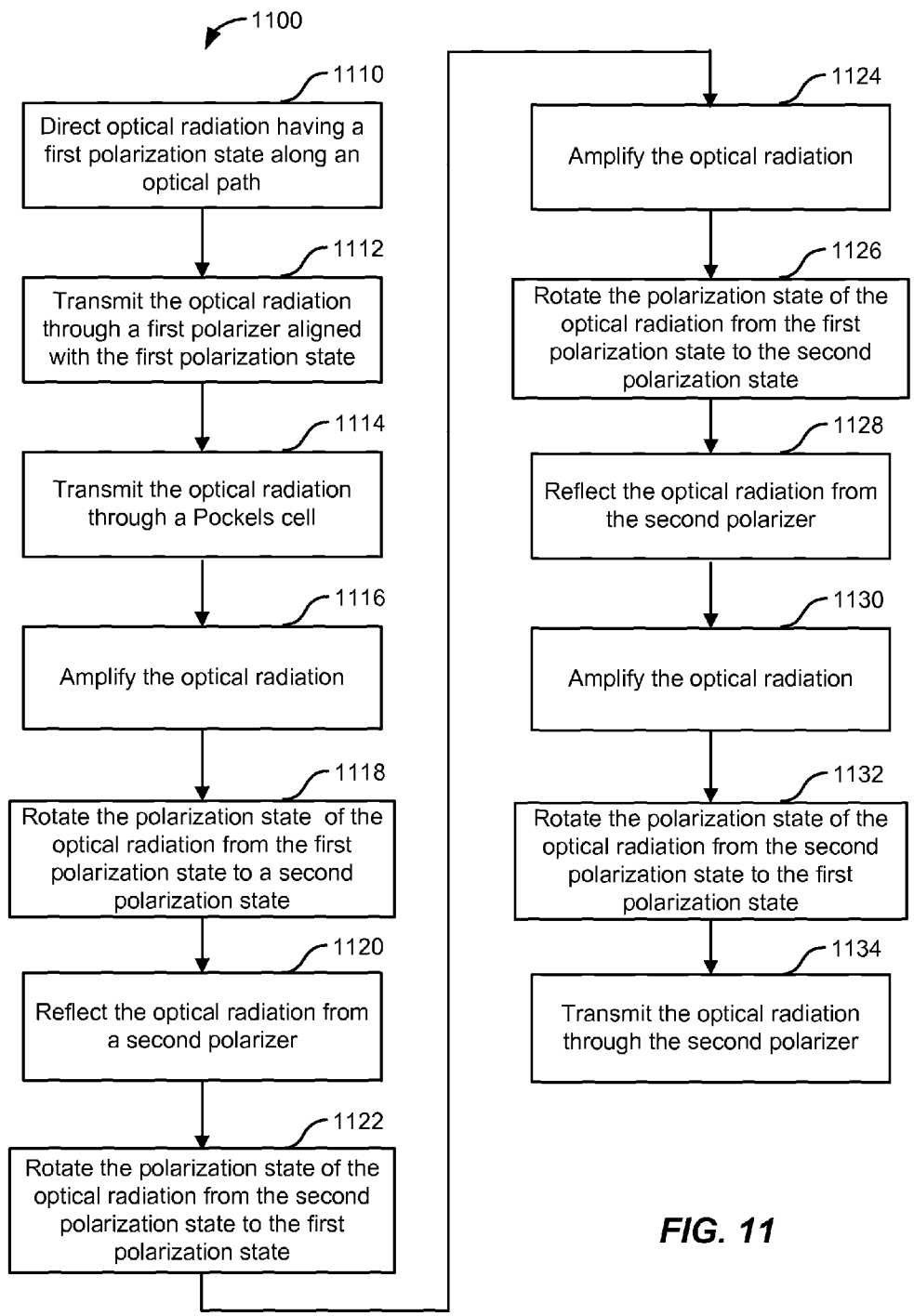
FIG. 11 is a simplified flowchart illustrating a method of amplifying a pulsed laser beam using the laser amplifier illustrated in FIG. 5A according to an embodiment of the present invention.

FIG. 11 is a simplified flowchart illustrating a method of amplifying a pulsed laser beam using the laser amplifier illustrated in FIG. 5A according to an embodiment of the present invention. The method 1100 includes directing optical radiation of the pulsed laser beam, which is polarized in a first polarization state, along an optical path (1110), transmitting the optical radiation through a first polarizer having a polarization axis aligned with the first polarization state (1112), and transmitting the optical radiation through a Pockels cell (1114). No substantial change in the first polarization state of the optical radiation results from transmitting the optical radiation through the Pockels cell.

The method also includes amplifying the optical radiation (1116), rotating the polarization state of the optical radiation from the first polarization state to a second polarization state orthogonal to the first polarization state (1118), and reflecting the optical radiation from a second polarizer having a transmission axis aligned with the first polarization state (1120). Amplifying the optical radiation can include use of a single optical gain element. Rotating the polarization state of the optical radiation from the first polarization state to a second polarization state orthogonal to the first polarization state can be performed using a Faraday rotator or other polarization rotation device. Amplifying the optical radiation can also include amplifying the optical radiation in a first optical gain element, thereafter rotating the polarization state of the optical radiation, and amplifying the optical radiation in a second optical gain element. Thus, amplification includes the use of both single amplifiers and multiple amplifier stages.

The method further includes rotating the polarization state of the optical radiation from the second polarization state to the first polarization state using the Pockels cell (1122), amplifying the optical radiation (1124), and rotating the polarization state of the optical radiation from the first polarization state to the second polarization state (1126).

The method additionally includes reflecting the optical radiation from the second polarizer (1128), amplifying the optical radiation (1130), rotating the polarization state of the optical radiation from the second polarization state to the first polarization state (1132), and transmitting the optical radiation through the second polarizer (1134). The method can also include spatially filtering the optical radiation one or more times using a relay telescope, a near-field spatial filter, or combinations thereof. In an embodiment, the method can further include transmitting the optical radiation through the Pockels cell such that no substantial change in the second polarization state of the optical radiation results from transmitting the optical radiation through the Pockels cell prior to amplifying the optical radiation a third time.

It should be appreciated that the specific steps illustrated in FIG. 11 provide a particular method of amplifying a pulsed laser beam according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical amplifier system comprising:
   an input aperture operable to receive light propagating along an optical path in a first direction;
   a first polarizer disposed along the optical path, wherein the first polarizer is operable to pass light having a polarization state aligned with a first polarization axis;
   a first Pockels cell operable to receive light passing through the first polarizer;
   an optical gain element disposed along the optical path;
   a second Pockels cell disposed along the optical path;
   a second polarizer disposed along the optical path, wherein the second polarizer is operable to pass light having a polarization state aligned with the first polarization axis;
   a first mirror operable to receive light reflected from the second polarizer;
   a second mirror operable to receive light reflected from the first polarizer; and
   an output aperture operable to transmit light passing through the second polarizer.

2. The optical amplifier system of claim 1 wherein:
   the first Pockels cell is operable to convert light having a polarization state aligned with the first polarization axis to light having a polarization state aligned with a second polarization axis orthogonal to the first polarization axis; and
   the second Pockels cell is operable to convert light having a polarization state aligned with the first polarization axis to light having a polarization state aligned with the second polarization axis.

3. The optical amplifier system of claim 1 further comprising:
   a near field spatial filter disposed along the optical path and operable to receive light amplified by the optical gain element.

4. The optical amplifier system of claim 1 further comprising:
   a second optical gain element disposed along the optical path; and
   a second near-field filter disposed along the optical path and operable to receive light amplified by the second optical gain element.

5. The optical amplifier system of claim 1 further comprising a relay telescope disposed along the optical path.

6. The optical amplifier system of claim 5 wherein the relay telescope comprises:
   a first filter element comprising:
      a first pair of cylindrical lenses separated by a first distance, each of the first pair of cylindrical lenses having a first focal length; and a first slit filter positioned between the first pair of cylindrical lenses; and
a second filter element overlapping with the first filter element, the second filter element comprising:
a second pair of cylindrical lenses separated by a second distance, each of the second pair of cylindrical lenses having a second focal length; and
a second slit filter positioned between the second pair of cylindrical lenses.

7. The optical amplifier system of claim 5 wherein the relay telescope comprises:
a first astigmatic lens having a first focal length for a first direction and a second focal length for a second direction orthogonal to the first direction;
a first slit filter separated from the first astigmatic lens by the first focal length;
a second slit filter separated from the first astigmatic lens by the second focal length; and
a second astigmatic lens having a third focal length for the first direction and a fourth focal length for the second direction.

8. The optical amplifier system of claim 1 further comprising a harmonic converter operable to modify a frequency of the light passing through the second polarizer.

9. A method of amplifying input light having a first polarization state aligned with a first polarization axis, the method comprising:
directing the input light to impinge on a first polarizer having a transmission axis aligned with the first polarization axis;
transmitting the input light through the first polarizer;
transmitting the input light through a first Pockels cell operating in a first state;
amplifying the input light;
transmitting the input light through a second Pockels cell operating in a second state;
reflecting the input light from a second polarizer having a transmission axis aligned with the first polarization axis;
reflecting the input light from a first mirror;
transmitting the input light through the second Pockels cell operating in the second state;
amplifying the light to provide a twice amplified beam;
transmitting the twice amplified beam through the first Pockels cell operating in the second state;
reflecting the twice amplified beam from the first polarizer;
reflecting the twice amplified beam from a second mirror; and
transmitting the twice amplified beam through the first Pockels cell operating in the second state.

10. The method of claim 9 further comprising:
amplifying the twice amplified beam to provide a three times amplified beam;
transmitting the three times amplified beam through the second Pockels cell operating in the first state; and
transmitting the three time amplified beam through the second polarizer.

11. The method of claim 9 wherein transmitting the input light through the second Pockels cell operating in the second state comprises converting the input light from a first polarization state aligned with the first polarization axis to a second polarization state aligned with a second polarization axis orthogonal to the first polarization axis.

12. The method of claim 9 wherein transmitting the twice amplified beam through the first Pockels cell operating in the second state comprises converting the twice amplified beam from a first polarization state aligned with the first polarization axis to a second polarization state aligned with a second polarization axis orthogonal to the first polarization axis.

13. The method of claim 9 further comprising transmitting the amplified input light through a near-field spatial filter.

14. The method of claim 9 further comprising transmitting the amplified input light through a relay telescope.

15. An optical amplifier system comprising:
a first optical switch having a first state and a second state, wherein the first optical switch is operable to pass light in the first state and reflect light in the second state;
an optical gain element coupled to the first optical switch; and
a second optical switch coupled to the optical gain element and having a first state and a second state, wherein the second optical switch is operable to pass light in the first state and reflect light in the second state.

16. The optical amplifier system of claim 15 further comprising a near-field spatial filter coupled to the optical gain element.

17. The optical amplifier system of claim 15 further comprising a relay telescope coupled to the optical gain element.

18. The optical amplifier system of claim 17 wherein the relay telescope comprises:
a first filter element comprising:
a first pair of cylindrical lenses separated by a first distance, each of the first pair of cylindrical lenses having a first focal length; and
a first slit filter positioned between the first pair of cylindrical lenses; and
a second filter element overlapping with the first filter element, the second filter element comprising:
a second pair of cylindrical lenses separated by a second distance, each of the second pair of cylindrical lenses having a second focal length; and
a second slit filter positioned between the second pair of cylindrical lenses.

19. The optical amplifier system of claim 17 wherein the relay telescope comprises:
a first astigmatic lens having a first focal length for a first direction and a second focal length for a second direction orthogonal to the first direction;
a first slit filter separated from the first astigmatic lens by the first focal length;
a second slit filter separated from the first astigmatic lens by the second focal length; and
a second astigmatic lens having a third focal length for the first direction and a fourth focal length for the second direction.

20. The optical amplifier system of claim 15 wherein the first optical switch comprises:
a polarizer operable to pass light in a first polarization state aligned with a first polarization axis;
a mirror operable to reflect light incident from the polarizer; and
a Pockels cell operable to convert light in the first polarization state into light in a second polarization state orthogonal to the first polarization state.

21. The optical amplifier system of claim 20 wherein the second optical switch comprises:
a second polarizer operable to pass light in the first polarization state aligned with the first polarization axis;
a second mirror operable to reflect light incident from the second polarizer; and
a second Pockels cell operable to convert light in the first polarization state into light in a second polarization state orthogonal to the first polarization state.

22. The optical amplifier system of claim 21 further comprising a controller operable to:
   actuate the Pockels cell to place the first optical switch in the second state; and
   actuate the second Pockels cell to place the second optical switch in the second state.

23. The optical amplifier system of claim 15 further comprising a second optical gain element.

24. The optical amplifier system of claim 15 further comprising a beam expanding telescope coupled to the first optical switch.

25. The optical amplifier system of claim 15 further comprising a frequency converting element coupled to the second optical switch.

26. A method of amplifying optical radiation;
   transmitting optical radiation through a first optical switch disposed in a first state;
   amplifying the optical radiation;
   reflecting the optical radiation from a second optical switch disposed in a second state;
   amplifying the optical radiation;
   reflecting the optical radiation from the first optical switch disposed in a second state;
   amplifying the optical radiation; and
   transmitting optical radiation through the second optical switch disposed in a first state.

27. The method of claim 26 further comprising spatially filtering the optical radiation before reflecting the optical radiation from the second optical switch.

28. The method of claim 27 wherein spatially filtering the optical radiation comprises transmitting the optical radiation through a near-field spatial filter.

29. The method of claim 27 wherein spatially filtering the optical radiation further comprising transmitting the optical radiation through a relay telescope.

30. The method of claim 26 wherein amplifying the optical radiation comprises transmitting the optical radiation through two or more optical gain elements disposed along an optical path.

31. The method of claim 26 wherein the first optical switch comprises a polarizer, a Pockels cell, and a mirror.

32. The method of claim 31 wherein the Pockels cell converts light in a first polarization state into light into a second polarization state orthogonal to the first state when disposed in the second state.

33. The method of claim 32 wherein the Pockels cell passes light in the first polarization state when disposed in the first state.

34. The method of claim 26 wherein the second optical switch comprises a polarizer, a Pockels cell, and a mirror.

* * * * *